United States Patent [19]
Asaoka et al.

[11] Patent Number: 5,294,308
[45] Date of Patent: Mar. 15, 1994

[54] METHOD OF PREDICTING A SHORT CIRCUIT IN AN ELECTROLYTIC FINISHING SYSTEM

[75] Inventors: Teruo Asaoka; Haruki Sugiyama; Shogo Yoshioka, all of Shizuoka, Japan

[73] Assignee: Shizuoka Seiko Co., Ltd., Shizuoka, Japan

[21] Appl. No.: 69,674

[22] Filed: Jun. 1, 1993

Related U.S. Application Data

[63] Continuation of Ser. No. 966,665, Oct. 26, 1992, abandoned, which is a continuation of Ser. No. 624,852, filed as PCT/JP90/00486, Apr. 11, 1990, abandoned.

[30] Foreign Application Priority Data

| Apr. 12, 1989 [JP] | Japan | 1-92713 |
| Apr. 14, 1989 [JP] | Japan | 1-95652 |
| Jul. 6, 1989 [JP]  | Japan | 1-175315 |

[51] Int. Cl.⁵ .............................. G01N 27/26
[52] U.S. Cl. ....................... 204/129.2; 204/129.43; 204/129.5; 204/DIG. 9

[56] References Cited

U.S. PATENT DOCUMENTS

| 3,520,791 | 7/1970  | Pfau et al.      | 204/129.2  |
| 3,627,667 | 12/1971 | Plofsky          | 204/129.2  |
| 3,679,566 | 7/1972  | Fulkerson        | 204/129.2  |
| 3,713,020 | 1/1973  | Kohler           | 204/129.25 |
| 4,227,988 | 10/1980 | Galwey et al.    | 204/406    |
| 4,819,602 | 4/1989  | Mieno et al.     | 204/401    |
| 4,956,060 | 9/1990  | Kuwabara et al.  | 204/129.43 |
| 5,028,303 | 7/1991  | Kuwabara et al.  | 204/129.43 |

*Primary Examiner*—John Niebling
*Assistant Examiner*—Bruce F. Bell
*Attorney, Agent, or Firm*—Nikaido, Marmelstein, Murray & Oram

[57] ABSTRACT

Method of predicting a short circuit in an electrolytic finishing system where a machining pulse is supplied between an electrode and a work disposed in electrolyte with a predetermined space is disclosed. An abnormal change of electrode-to-electrode voltage during the supply of the machining pulse is detected, and the supply of the machining pulse is stopped in accordance with the detection.

8 Claims, 27 Drawing Sheets

(a) VOLTAGE (b) CURRENT

A | B | C (c) PULSE t

METHOD OF PREDICTING A SHORT CIRCUIT IN AN ELECTROLYTIC FINISHING SYSTEM

This application is a continuation application of Ser. No. 966,665 filed Oct. 26, 1992, now abandoned, which is a continuation of Ser. No. 624,852 filed Dec. 10, 1990, now abandoned which is the national stage application of International application Ser. No. PCT/JP90/00486 filed Apr. 11, 1990.

TECHNICAL FIELD

The present invention relates to a method of predicting a short circuit in an electrolytic finishing system and more particularly to a method wherein an occurrence of an arc during a supply of machining pulse is predicted so as to prevent the short circuit beforehand, thus preventing a work from burning.

TECHNICAL BACKGROUND

Japanese Patent Publication 56-30124 discloses a system for detecting abnormal phenomenon between electrodes in an electrolytic finishing system where an electrode is moved to maintain a small gap formed between the electrode and the work. In the system, a spark generating between the electrode and the work is detected. Japanese Patent Publication 57-22690 discloses a system for predicting a short circuit in an electrolytic finishing process where a work is subjected to the electrolytic finishing process by supplying a pulse current to a wire which serves as an electrode.

In the former abnormality detecting system, a decrease of voltage and an increase of current magnitudes of which is caused by a spark are detected. However, the generation of the spark is an abnormal phenomenon itself, and hence the work would have been burnt by the spark. Therefore, in an electrolytic finishing method disclosed in Japanese Patent Application Laid-Open 63-216628 where the work is electrolytically finished, using an electrode having a surface corresponding to a machining surface of the work, there is a critical problem that the work machined to a desired three-dimensional shape is burnt in a second.

The latter short circuit detecting method detects the occurrence of the short circuit, and not the abnormal phenomenon. A discharge voltage, while the supply of the machining pulse is stopped, is detected. The detected voltage, which substantially is constant during normal operation, abnormally decreases from the detected discharge voltage when the short circuit is expected. Therefore, the short circuit can be detected by the abnormal decrease of the discharge voltage. However, it is not possible to predict the short circuit while the machining pulse is being supplied. In the electrolytic machining method described above, when the pulse width of the machining pulses is relatively large, a short circuit occurs due to residual products formed in the gap while the machining pulse is fed, which causes a burn of the work.

The object of the present invention is to provide a method for solving the above described problems, wherein an occurrence of an arc is predicted, while a machining pulse is applied, so as to prevent the short circuit beforehand, thereby preventing the work from burning.

DISCLOSURE OF THE INVENTION

The present invention is characterized by a method predicting a short circuit in an electrolytic finishing system where a machining pulse is supplied between an electrode and a work disposed in electrolyte with a predetermined space, there-between, so as to electrolytically finish the work, the method comprising detecting an abnormal change of a component of electrode-to-electrode electric energy during the supply of the machining pulse, and cutting off the supply of the machining pulse in accordance with the detection.

BEST MODE FOR EMBODYING THE INVENTION

An embodiment of the present invention is hereinafter specifically described in detail.

Figure 1:
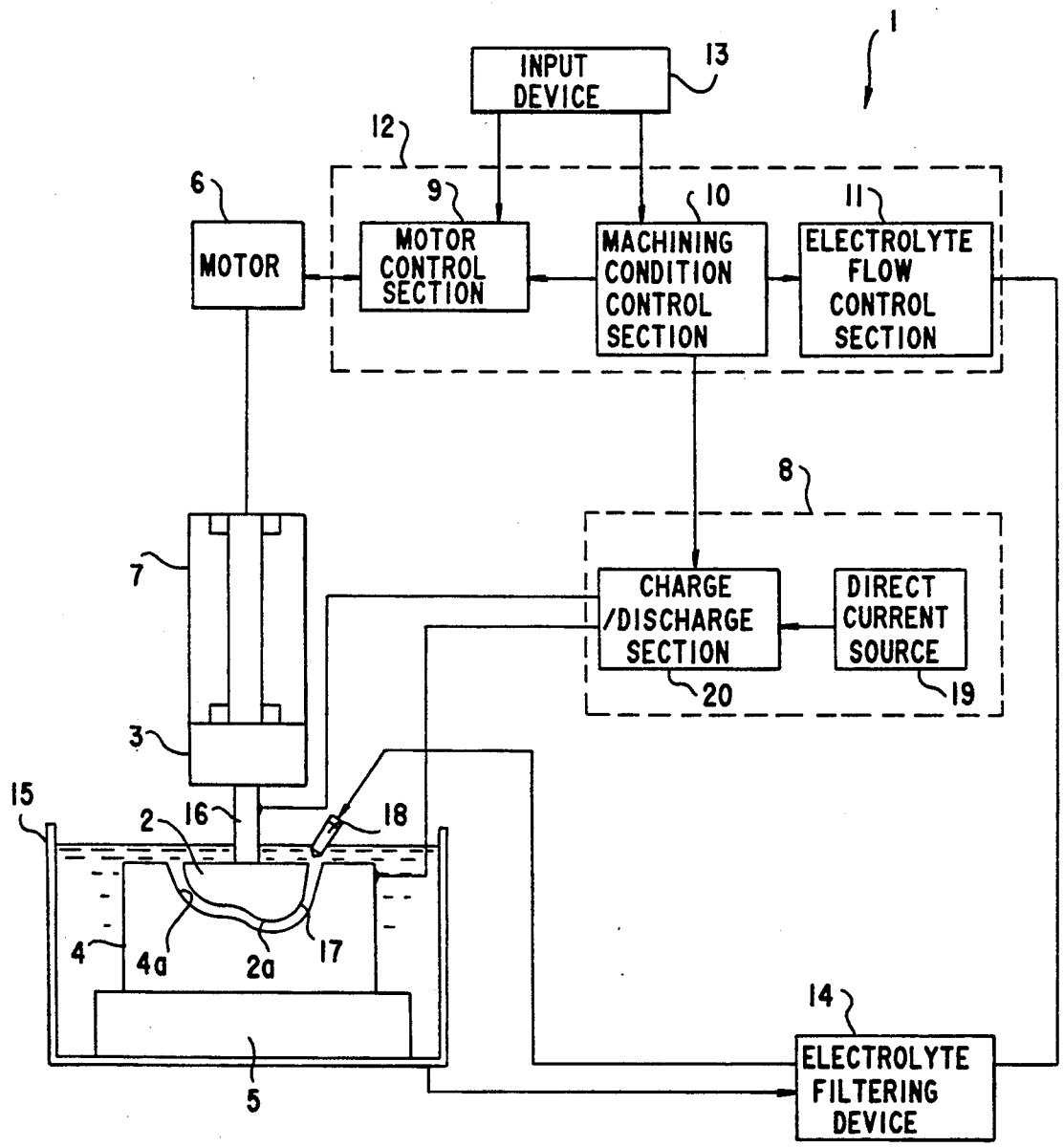
FIG. 1 is a schematic illustration showing a system of an electrolytic finishing machine according to the present invention.

FIGS. 1 to 3 shows an electrolytic finishing machine 1 for embodying the present invention. Referring to FIG. 1, the electrolytic finishing machine 1 has an electrode holding device 3 for holding an electrode 2, a work fixing device 5 for fixing a work 4, an electrode driving direction converter 7 arranged to change a rotary output of a servo motor 6 into axial movement, a source device 8 which generates a machining pulse, a control unit 12 comprising a motor control section 9, a machining condition control section 10 and an electrolyte flow control section 11, an input device 13 for inputting machining conditions, an electrolyte filtering device 14 for filtering out residual products in electrolyte, and a tank 15.

The electrode 2 made of copper or graphite is secured to the lower end of a rod 16 of the electrode holding device 3 so as to form a gap 17 between the electrode 2 and the work 4 at an equal three-dimensional distance there-between. The holding device 3 is operatively connected to the servo motor 6 which is operated by a control signal from the motor control section 9 to be vertically moved, thereby providing the predetermined gap between an electrode surface 2a and a work surface 4a. The work fixing device 5 is a table made of insulation such as granite and ceramic material on which the work 4 is fixed through a setting jig (not shown). Numeral 18 designates a nozzle through which clean electrolyte is fed.

The input device 13 is arranged to input various machining condition signals such as the material of the work 4, surface area of the work, desired machining depth machining conditions, and initial dimension of the gap between the electrode 2 and the work 4. The signals are fed to the motor control section 9 and the machining condition control section 10. The filtering device 14 supplies the electrolyte to the tank 15, in response to an output signal of the electrolyte flow control section 11, and feeds the electrolyte through the nozzle 18 during the machining so as to remove residual products in the gap 17.

Figure 2A:
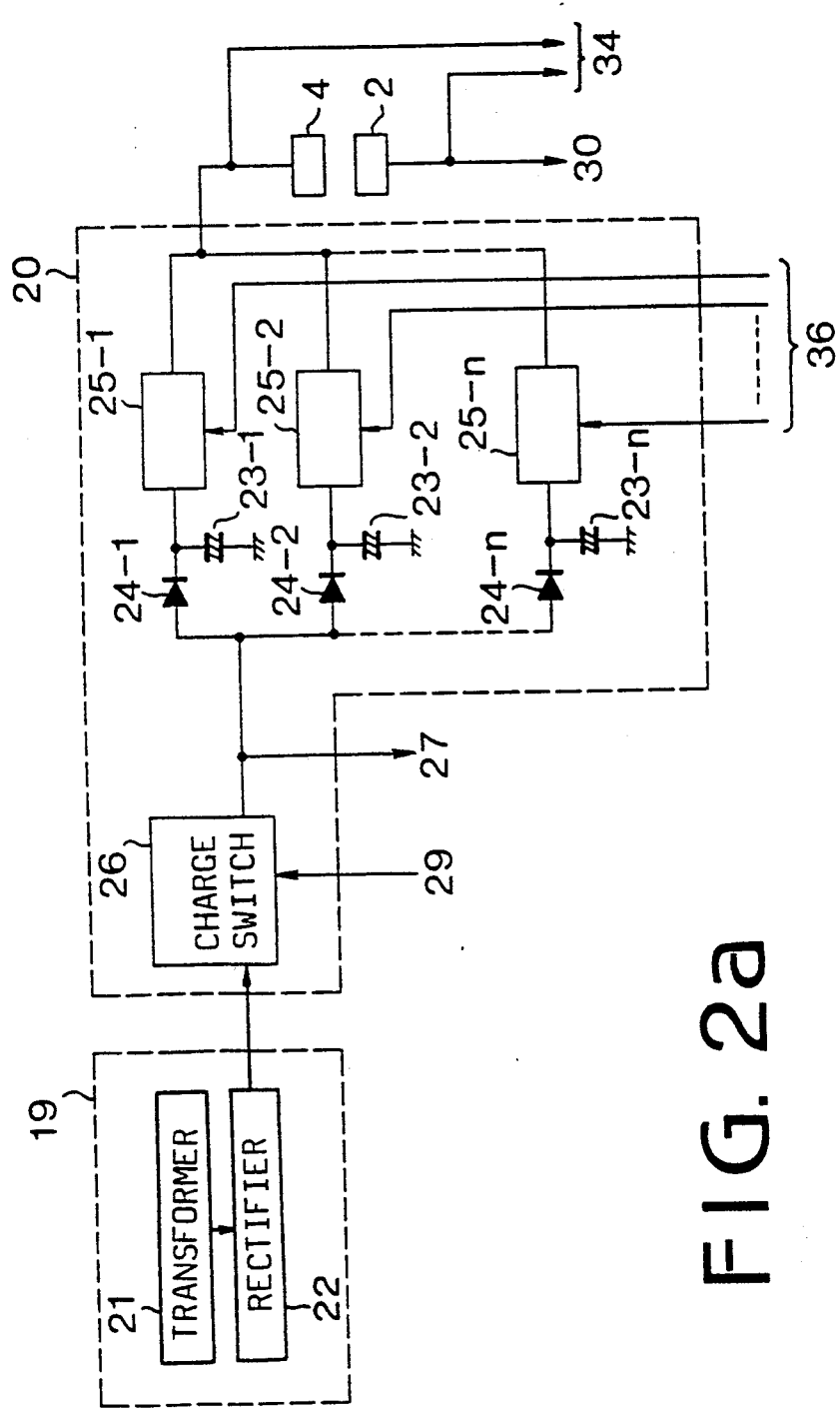
FIGS. 2a and 2b are block diagrams showing a system for supplying a current to an electrode and a work.
Figure 2B:
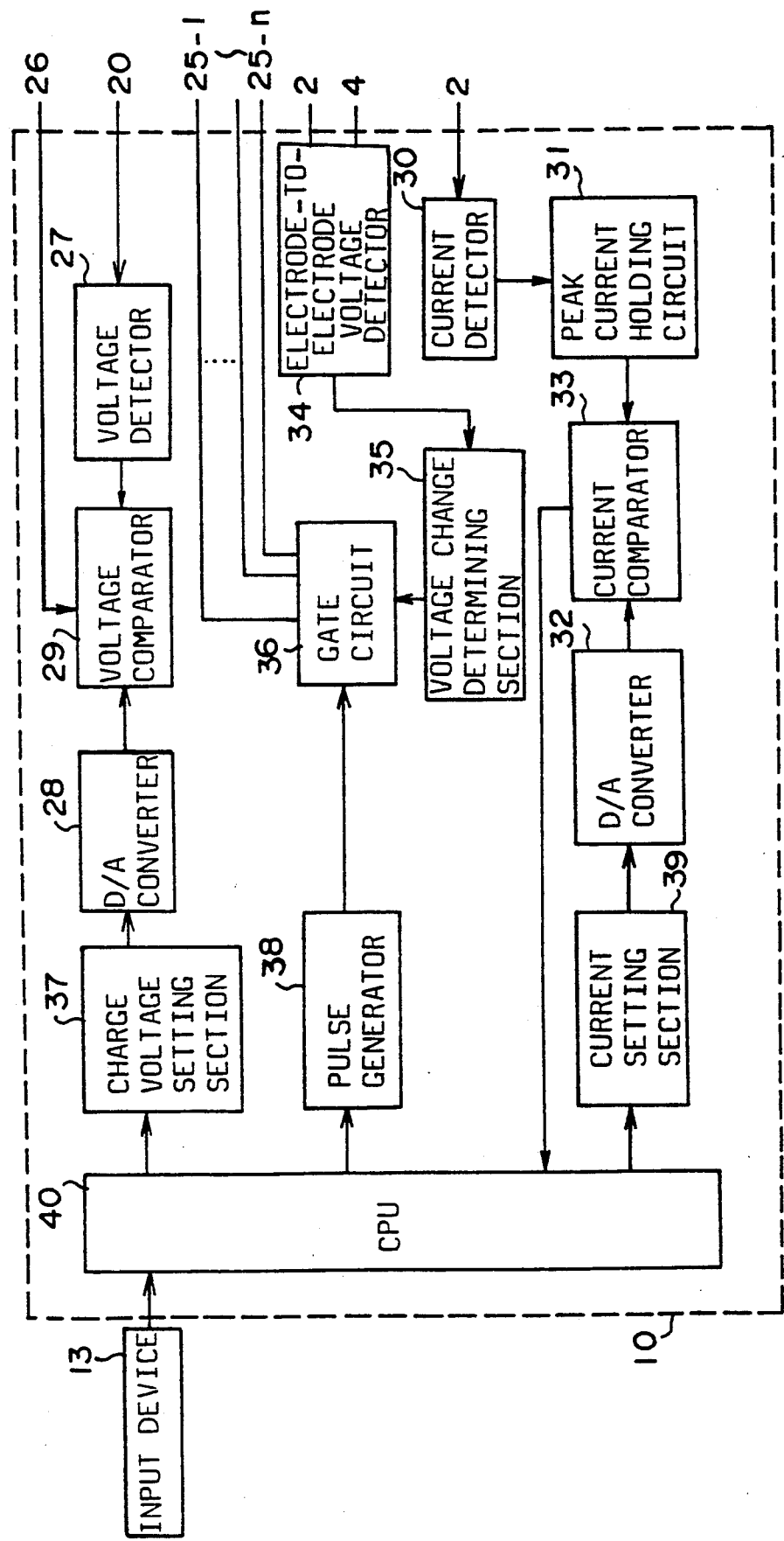

The source device 8 for providing a predetermining pulse between the electrode 2 and the work 4, comprises a direct current source 19 and a charge/discharge section 20. As shown in FIGS. 2a and 2b, direct current source 19 comprises a transformer 21 and a rectifier 22. The current source 19 is connected to capacitors 23-1 to 23-n through the rectifier 22. Thus, the voltage is reduced to a predetermined value at the transformer 21 and rectified to a direct current by the rectifier 22.

Referring to FIGS. 2a and 2b, the charge/discharge section 20 has a plurality of capacitors 23-1 to 23-n which are connected in parallel with each other, diodes 24-1 to 24-n for preventing reverse current to the current source 19, switches 25-1 to 25-n for generating pulses, and a charge switch 26 for connecting the direct current source 19 to capacitors 23-1 to 23-n to charge each capacitor to a set value.

The machining condition control section 10 comprises a voltage detector 27 for detecting the charge voltage applied to the capacitors 23-1 to 23-n, a voltage comparator 29 for comparing a voltage from a D/A converter 28 with the charge voltage detected by the voltage detector 27, a current detector 30 for detecting the current of the electric charge discharged between the work 4 and the electrode 2, a peak current holding circuit 31 for holding a peak current detected by the current detector 30, a current comparator 33 for comparing the peak current from the peak current holding circuit 31 with the current supplied from a D/A converter 32, an electrode-to-electrode voltage detector 34 for detecting a voltage between the electrode 2 and the work 4, voltage change determining section 35 for determining the change of the discharge voltage in dependency on the voltage detected by the voltage detector 34, a gate circuit 36 for supplying an operation signal to switches 25-1 to 25-n in response to signals from pulse generator 38, a charge voltage setting section 37 for setting charge voltage applied to the capacitors 23-1 to 23-n, and applying output signal to the D/A converter 32, and a CPU 40 applied with signals from the devices to calculate machining and others.

Figure 3A:
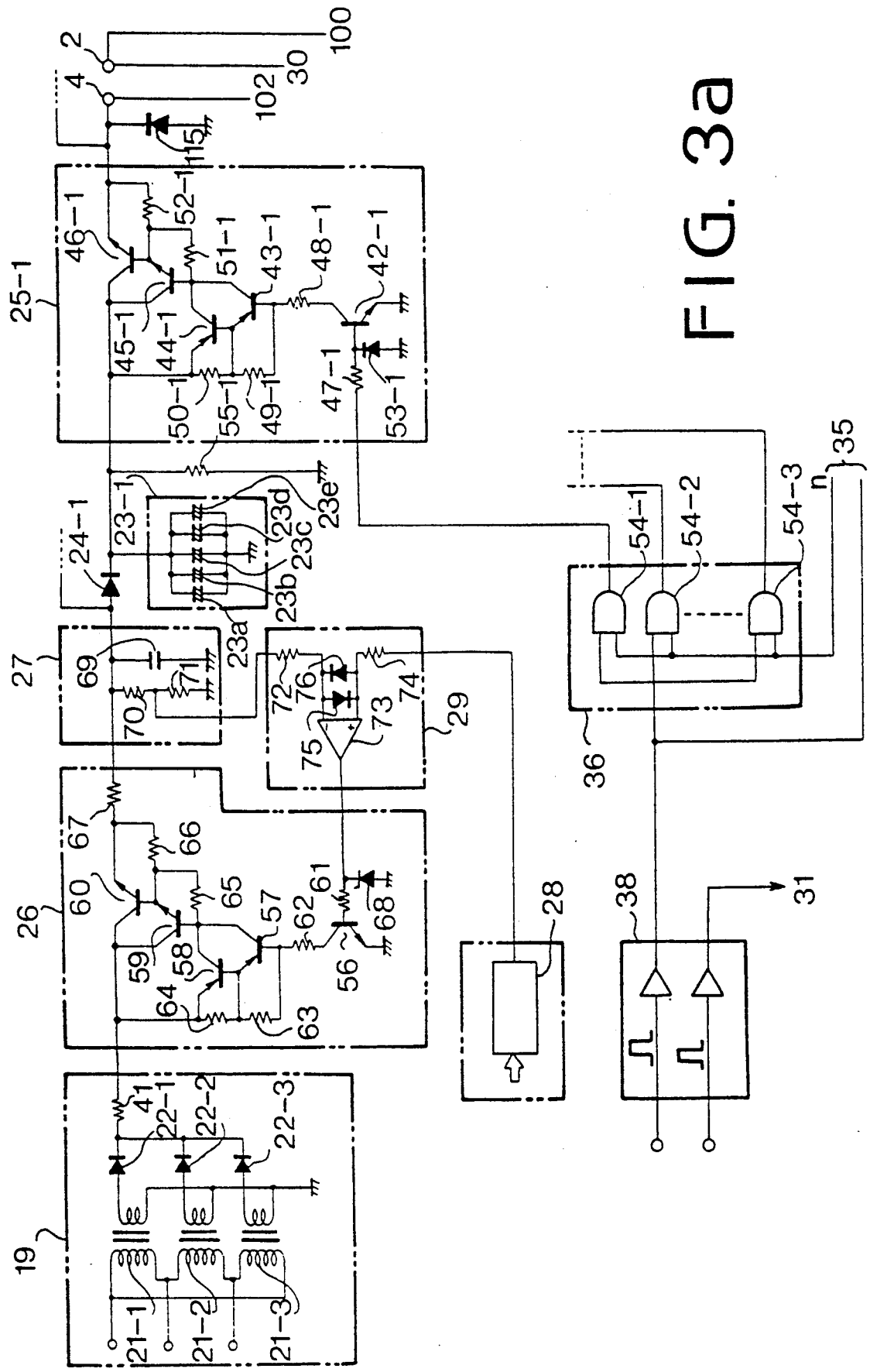
FIGS. 3a and 3b show a circuit corresponding to a main part of the block diagram shown in FIGS. 2a and 2b.
Figure 3B:
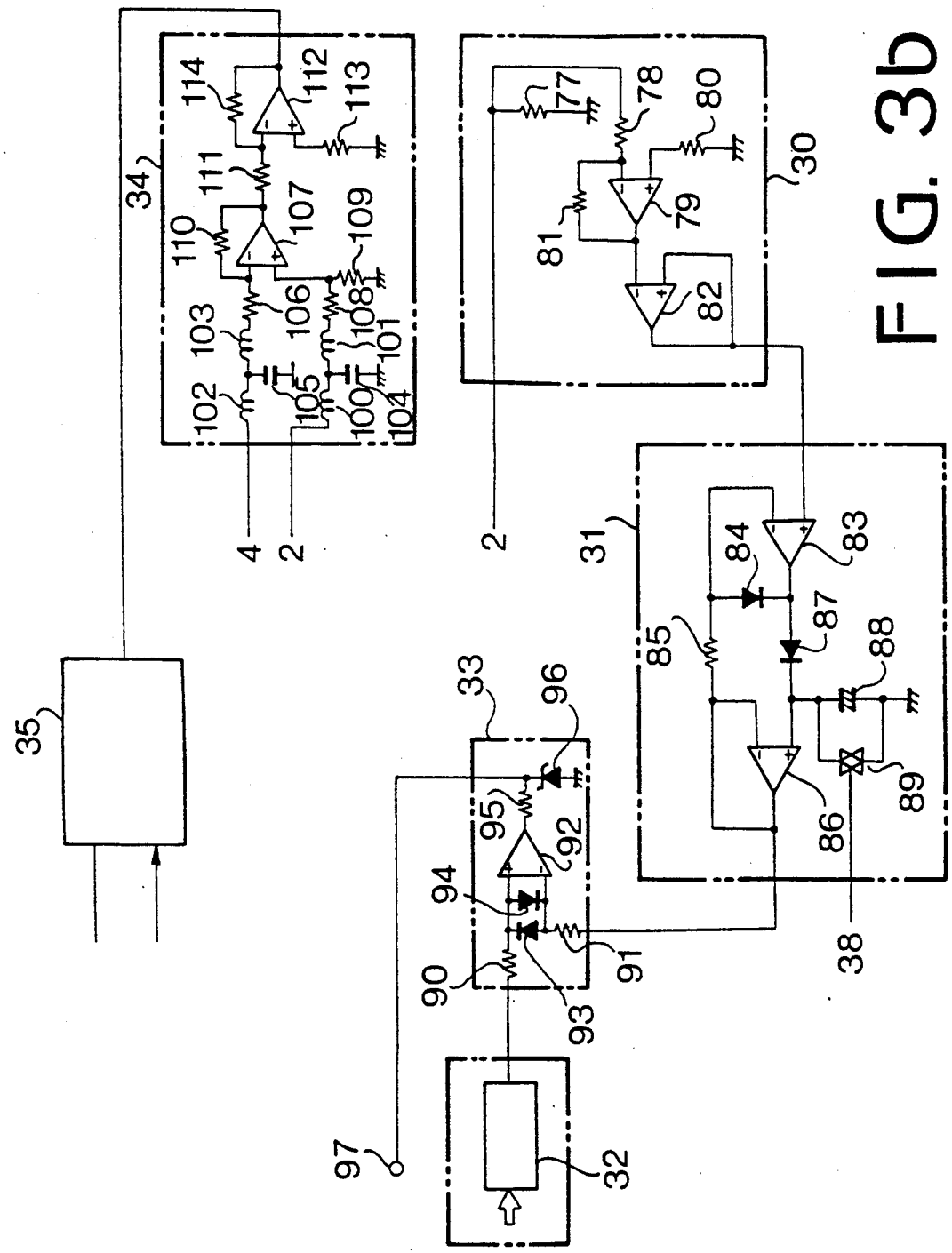

FIG. 3a and 3b showing circuits of the system, which corresponds to the schematic block diagram shown in FIGS. 2a and 2b. The same parts as those in FIGS. 2a and 2b are designated by the same numerals.

The direct current source 19 has coils 21-1 to 21-3 for reducing voltage to a predetermined value, and diodes 22-1 to 22-3 for rectifying the current so as to produce a direct current. The direct current is output through a resistor 41. The discharge switch 25-1 (since each switch 25-1 to 25-n has the same construction as the other, only the switch 25-1 is described) comprises five transistors 42-1 to 46-1, and six resistors 47-1 to 52-1 and a diode 53-1. The transistor 42-1 is connected to an AND gate 54-1 of the gate circuit 36 through the resistor 47-1. The transistors 42-1 to 46-1 are sequentially turned on in response to the signal from the AND gate 54-1 to discharge the capacitor 23-1.

The capacitor 23-1 comprises five capacitors 23a to 23e each having an electrostatic capacity of 0.22 F(farad), connected with each other in parallel. The capacitors 23-1 to 23-n are further connected in parallel so that the source device 8 has an electrostatic capacity of 10 to 20F as a whole. Numeral 55-1 designates a resistor connected to the capacitor 23-1 in parallel.

The charge switch 26, like the discharge switch 25-1, comprises five transistors 56 to 60, seven resistors 61 to 67 and a diode 68. The base of transistor 56 is connected to the voltage comparator 29. The transistors 56 to 60 are controlled in response to the signal from the comparator 29, such that a predetermined charge voltage from the direct current source 19 is applied to the capacitors 23-1 to 23-n.

The voltage detector 27 has a capacitor 69 and resistors 70 and 71 connected in series with each other and connected to the capacitor 69 in parallel. A charge voltage divided across the resistors is applied to an input of a comparator 73 in the voltage comparator 29 through a resistor 72.

The other input of the comparator 73 is applied with a set charge voltage from a D/A converter 28 through a resistor 74. Diodes 75 and 76 are connected between inputs of the comparator 73. An output signal of the comparator 73 is applied to the base of the transistor 56 through the resistor 61 of the charge switch 26.

The current detector 30 is connected to the electrode 2 through a resistor 77 which is connected to the ground. The electrode 2 is further connected to one of inputs of an amplifier 79 through a resistor 78 and the other input of the amplifier 79 is connected to the ground through a resistor 80. An output of the amplifier 79 is connected to one of inputs of an amplifier 82, to which the input of the amplifier 79 is connected through a resistor 81. The output of the amplifier 82 is connected to the peak current holding circuit 31 for supplying a detected discharge current.

The peak current holding circuit 31 comprises an amplifier 83, one input of which is connected to an output thereof through a diode 84. The other input is applied with the signal from the amplifier 82. The input of the amplifier 83 is connected to one input of an amplifier 86 through a resistor 85. The output of the amplifier 83 is connected to the other input of the amplifier 86 through a diode 87. A capacitor 88 connected to the ground is connected to the other input of the amplifier 86. Across the capacitor 88, an analog switch 89 is connected, to which a pulse generator 38 is connected.

The peak current holding circuit 31 operates to hold the peak value of the current detected by the current detector 30 and to apply a peak current signal to the current comparator 33 which will later be described, and the peak current is reset by a reset pulse from the pulse generator 38.

The current comparator 33 comprises a comparator 92 connected to the output of the amplifier 86 of the peak current holding circuit 31 through a resistor 91 and applied with a signal from a D/A converter 32 through a resistor 90. Diodes 93 and 94 are connected between the comparator 92 and resistors 90 and 91. An output of the comparator 92 is connected to a resistor 95 which is in turn connected to a constant voltage diode 96 connected to the ground, and to an input terminal 97 of the CPU 40 for the controlling charge voltage.

The electrode-to-electrode voltage detector 34 has a pair of coils 100 and 101 connected to the electrode 2, a pair of coils 102 and 103 connected to the work 4 in series, and filters in the form of capacitors 104 and 105 for cutting off noises, each connected to the coils 100, 101 and 102, 103, respectively. The coil 101 is connected through a resistor 108 to one of inputs of an amplifier 107 which is connected to a ground through a resistor 109. The coil 103 is connected to the other input of the amplifier 107 through resistor 106 which is connected to the output of the amplifier 107 through a resistor 110. The output of the amplifier 107 is further connected to one of inputs of an amplifier 112, the output of which is connected to the input thereof through a resistor 114. The other input of the amplifier 112 is grounded through a resistor 113. The output of the amplifier 112 is applied to the input thereof. Thus, the voltage between electrodes is amplified. The amplified voltage is applied to the voltage change determining section 35 which will be later described.

The gate circuit 36 has AND gates 54-1 to 54-n which are turned on and off in accordance with the signals from the voltage change determining section 35 and the pulse generator 38.

Namely, when a high level signal (H) of a machining instruction pulse from the pulse generator 38 and a high level signal (H) from the voltage change determining section 35 is applied, the AND gates 54-1 to 54-n applies a high level signal to switches 25-1 to 25-n to render each of the transistors 42-1 to 42-n of the switches 25-1 to 25-n operative. Thus, the capacitors 23-1 to 23-n are discharged. If either of the output signals of the pulse generator 38 and the voltage change determining section 35 becomes a low level signal (L), each of AND gates 54-1 to 54-n produces a low level output, thereby rendering the transistors 42-1 to 42-n inoperative. Thus, the discharge of the capacitors 23-1 to 23-n is stopped. AND gates 54-1 to 54-n may be selectively operated in accordance with a signal from the pulse generator 38 corresponding to the necessary current density of the machining pulse. Numeral 115 shown in FIG. 3a designates a diode provided for preventing the discharge switch 25-1 to 25-n from breaking down by back electromotive force.

The electrolytic finishing machine 1 to which the present invention is applied has been hereinbefore described. The basic principles related to the present invention is described hereinafter with reference to FIGS. 4 and 5.

FIG. 4(a) shows waveforms of discharge voltage obtained through an experiment when the gap between the electrode 2 of the electrolytic finishing machine 1 and the work 4 is constant and the machining pulse applied has a width t as shown in FIG. 4(c). A waveform a shows a stable state under a normal condition. As the charge voltage set at the charge voltage setting section 37 and charged in the capacitors 23-1 to 23-n increases, the electrode-to-electrode voltage increases as shown by waveforms b to d ($a<b<c<d$).

As can be understood from the variation of the discharge voltage shown in the graph, the electrode-to-electrode voltage increases to a peak voltage Vp as soon as the machining pulse is applied and thereafter linearly decreases under the normal machining conditions (a). However, as the machining conditions between the electrode and the work becomes abnormal (thereby increasing the electrode-to-electrode voltage), the electrode-to-electrode voltage fluctuates. When arcs generate between the electrodes as shown by a waveform d, a phenomenon where the electrode-to-electrode voltage abnormally exceeds the peak voltage occurs.

A conceivable cause of the phenomenon is as follows. As shown by an equivalent circuit in FIG. 5, in a circuit having the capacitor 23, discharge switch 25, electrode 2 and work 4, there are resistance R and inductance L in the wiring. When the electrolytic finish is normally operated by the electrolytic finishing machine, a relationship between the change voltage V1 charged at the capacitor, and the discharge voltage V2 is as follows.

$$V1 - 3 > V2$$

When an abnormality exists between the electrodes, the electrode-to-electrode current rapidly changes so that the electrode-to-electrode voltage V2 increases due to the inductance L in the wiring. Since a voltage corresponding to the change Ldi/dt is added to the normal electrode-to electrode voltage. Immediately before the arc is generated, the changing rate di/dt is very large so that, V2 becomes nearly equal to 2V1. Consequently, electrode-to-electrode voltage V2 extremely increases.

FIG. 4(b) shows a current waveform which corresponds to the waveform d where arc generates. Steps until the short circuit can be inferred are as follows.

During a period A in which the normal machining is carried out until the electrode-to-electrode current abnormally decreases, the electrode-to-electrode current gradually decreases from the peak value because of the bubble and residual products generated therein. When a large quantity of bubbles generate, the electrode and the work are temporarily insulated, so that the electrode-to-electrode current abnormally decreases. Thereafter, the insulation is temporarily cancelled, thereby increasing the amperage. However, the relation between the electrode and the work is extremely unstable so that the electrodes are again temporarily insulated, again decreasing the amperage. Hence discharging phenomenon (arc) occurs, during a period B. As a result, the electrode and the work 4 are partly welded (short-circuited) so that the electrode current between the electrodes abnormally increases during a period C.

Figure 4:
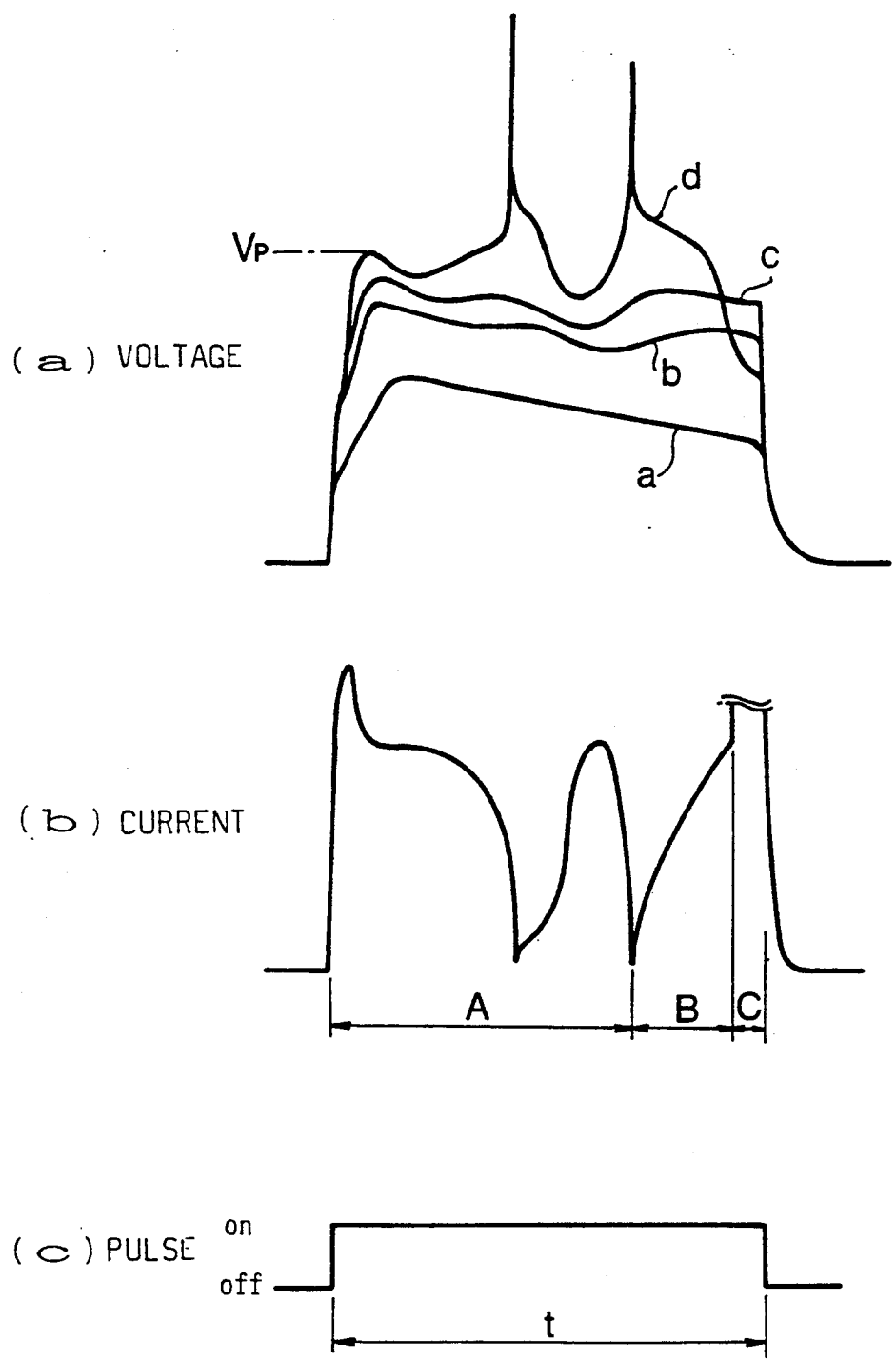
FIG. 4 shows waveforms for explaining a basic principle of the present invention.
Figure 5:
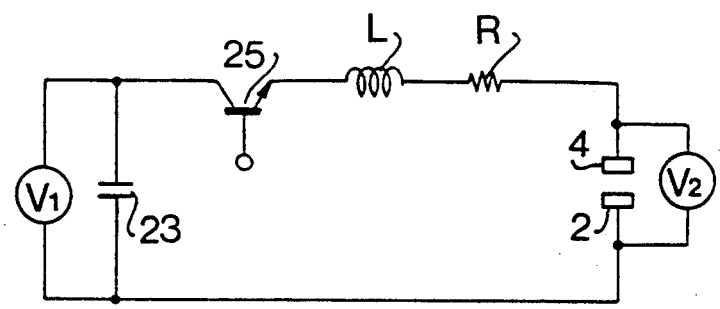
FIG. 5 is an equivalent circuit for explaining the principle.
Figure 6:
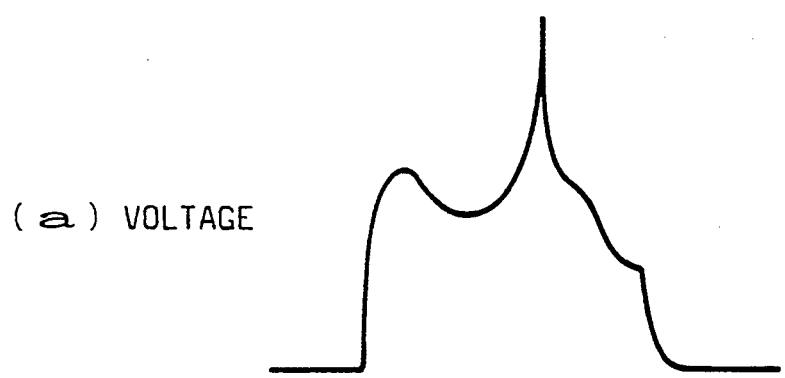
FIG. 6 shows another example of waveforms similar to those in FIG. 4.
Figure 6:
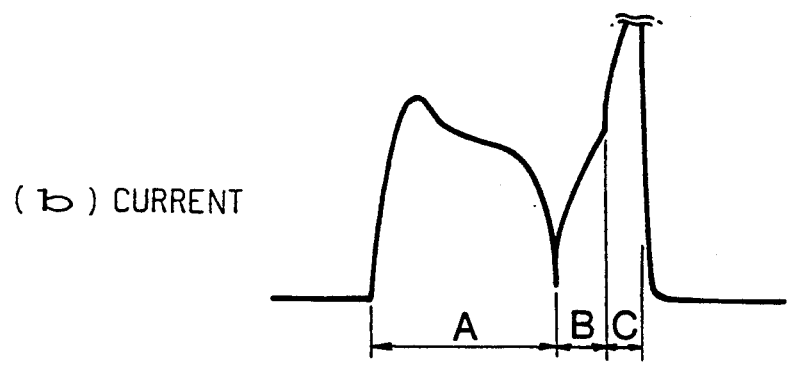
Figure 6:
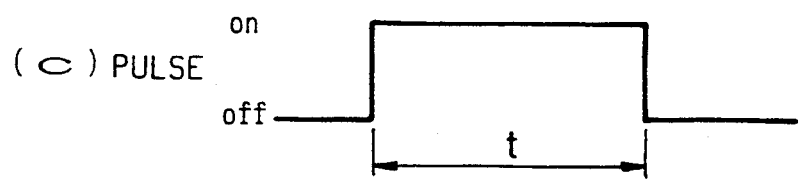

An experiment has shown that the size of a dent caused by the arc is proportional to the quantity of electricity during the period B. The machining pulse width t shown in FIG. 4 is 20 msec. An example where a shorter pulse width t such as 5 msec is employed is shown by a voltage waveform and current waveform in FIGS. 6(a) and 6(b), wherein it has been confirmed that the arc generates with only a single abnormal phenomenon showing abnormal rise in voltage and abnormal decrease in current.

Thus, although there is a slight difference in shape of the waveforms in dependency on the duration of the pulses t, the phenomenon, wherein the electrode-to-electrode voltage abnormally rises immediately before the arc generates, results in short circuit. The present invention, in consideration to the phenomenon perceived by the experiment, provides a system for predicting the occurrence of the arc and for preventing the short-circuiting between the electrodes.

Figure 8:
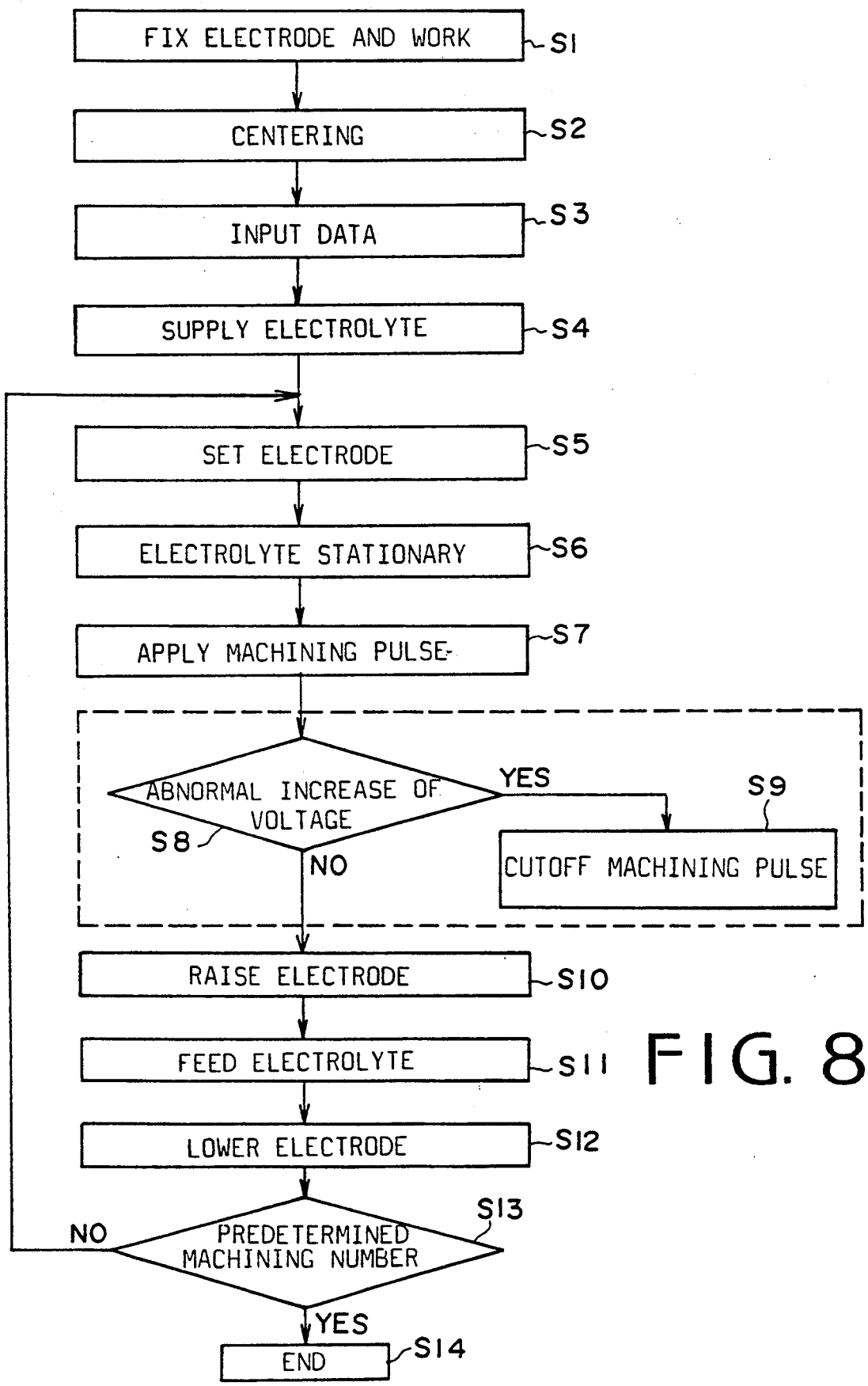
FIG. 8 is a flowchart showing the operation of an example of a finishing method.
Figure 9:
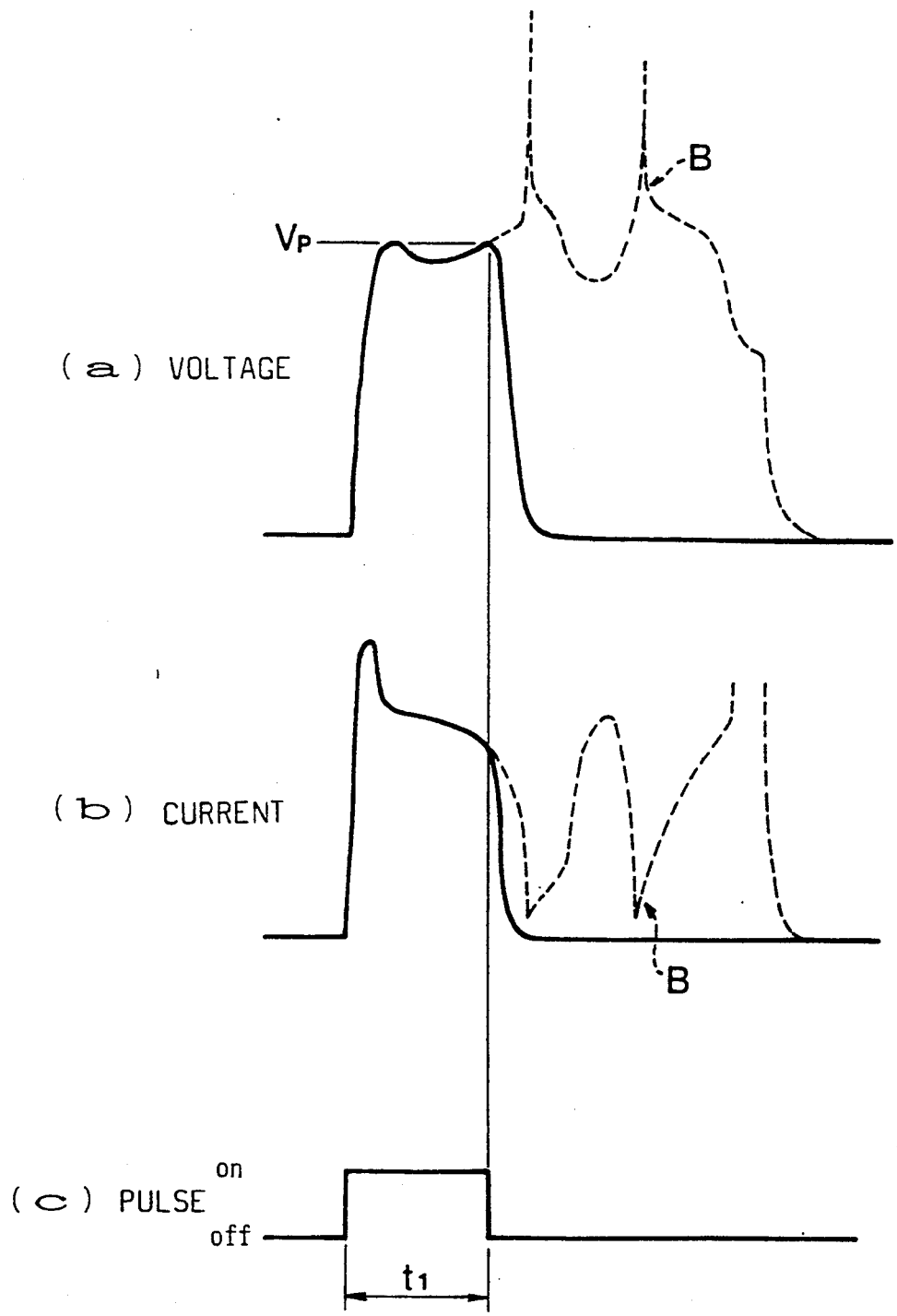
FIG. 9 is a timechart of the operation shown in FIG. 8.

The first embodiment of the present invention is described hereinafter with reference to FIGS. 7 to 9.

Figure 7:
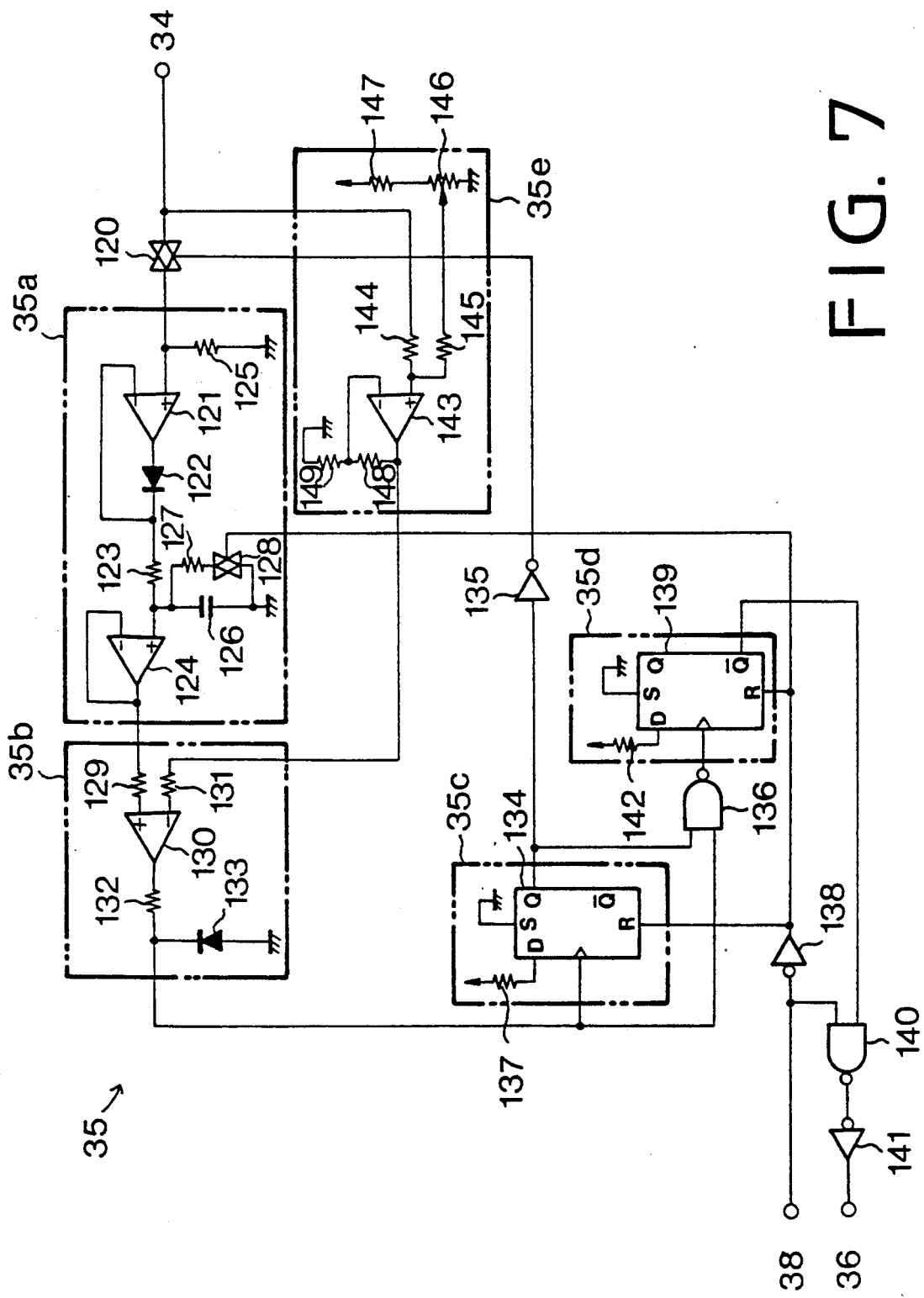
FIG. 7 shows a circuit of a voltage change determining section in a first embodiment of the present invention.

FIG. 7 shows the voltage change determining section 35 which comprises a peak hold circuit 35a, comparator circuit 35b, peak passage memory circuit 35c, cutoff hold circuit 35d and offset adder circuit 35e.

The peak hold circuit 35a comprises an amplifier 121 which is connected to the output of the discharge voltage detector 34 through an analog switch 120, and an amplifier 124 connected to the output of the amplifier 121 through a diode 122 and a resistor 123. One of the inputs of the amplifier 121 is connected to the ground through a resistor 125 and the other input is connected to the output of the diode 122. One of the inputs of the amplifier 124 is grounded through a capacitor 126. Across the capacitor 126 are connected a resistor 127 and an analog switch 128. The other input of the amplifier 124 is connected to the output thereof.

The comparator circuit 35b has a comparator 130, an input of which is connected to the output of the amplifier 124 through a resistor 129. The other input is connected through a resistor 131 to the output of an adder 143. The output of the comparator 130 is connected to the resistor 132 which is connected to the ground through a diode 133.

The peak passage memory circuit 35c has a flip-flop (hereinafter called FF) 134, a trigger terminal of which is connected to the output of the comparator 130 through the resistor 132. An output terminal Q of the FF 134 is connected to the analog switch 120 through a gate 135. Furthermore, the output terminal Q is connected to one of inputs of the NAND gate 136. The other input of the NAND gate 136 is connected to the trigger terminal of the FF 134. The D-terminal of the FF 134 is pulled up to the source through a resistor 137. The S-terminal is grounded and the R-terminal is connected to a pulse generator 38 through a gate 138.

The cutoff holding circuit 35d has an FF 139, a trigger terminal of which is connected to the output of the NAND gate 136. The output $\overline{Q}$ is connected to one of the inputs of a NAND gate 140. The other input of the NAND gate 140 is connected to the pulse generator 38 and the output is connected to the gate circuit 36 through a gate 141. A resistor 142 is provided to pull up the FF 139 to the source.

The offset adder circuit 35e comprises the adder 143, one of the inputs of which is connected to the discharge voltage detector 34 through a resistor 144 and to the source through a resistor 145 to 147 (a resistor 146 is a variable resistor one end of which is grounded). The other input of the adder 143 is connected to the output thereof through a resistor 148 and further to the ground through a resistor 149.

Explaining the operation of the voltage change determining section 35, when the machining instruction pulse is applied from the pulse generator 38, the analog switch 128 and FF 134 and 139 are set. At the same time, the discharge switches 25-1 to 25-n become operative, thereby supplying machining pulses. Thus, electrode-to-electrode voltage (hereinafter called electrode voltage) is detected by the electrode-to-electrode voltage detector 34. The detected electrode voltage is applied to the comparator circuit 35b through the offset adder circuit 35e as well as to the peak hold circuit 35a where the peak voltage is held.

When the electrode voltage supplied through the offset adder circuit 35e reaches and then declines from the peak value held at the peak hold circuit 35a, output of the comparator 130 is reversed (L → H) so that a high level signal (H) is applied to the trigger terminal of the FF 134, thereby setting the FF 134. Thus the passing of the voltage through the peak is stored. At the same time, the high level signal from the output terminal Q of the FF 134, inverted to the low level signal (L) by the gate 135, is fed to the analog switch 120, thereby opening it. Thus, the input of the voltage from the detector 34 to the peak hold circuit 35a is prohibited.

If the condition between the electrodes are normal so that the short circuit does not occur, the voltage under the peak value is detected for the period of time t which corresponds to the pulse width. After the machining pulse is turned off, the discharge voltage becomes zero. However, when there is an abnormality between the electrodes so that the electrode voltage increases and exceeds the peak value Vp (FIG. 4(a)), the output of the comparator 130 is inverted (H → L), thereby resetting the FF 134. Consequently, the output signal of the NAND gate 136 is inverted (L → H), thereby setting the FF 139.

As a result, a low level signal (L) from the output $\overline{Q}$ of the FF 139 is fed to the NAND gate 140, thereby inverting the output signal thereof (L → H). Thus, the gate 141 to which the high level signal (H) from the NAND gate 140 is fed becomes a low level signal (L). Accordingly, each gate 54-1 to 54-n produces a low level signal to render the switches 25-1 to 25-n unoperative. Thus, the machining pulse is cut off. The cut-off state is maintained until the pulse from the pulse generator 38 is fed to a reset terminal of the FF 139.

It goes without saying that each gate described in the present embodiment is not confined to that described, and may be modified as preferable. The embodiment may be further modified to construct the circuits, which are divided in the embodiment, in one part.

The machining method of the work employing the voltage change determining section 35 is described hereinafter with reference to the flowchart of FIG. 8.

The electrode 2 which was used at die sink electrical discharge machining or a remainder of the electrode used at a wire cut electrical discharge machining is attached to the rod 16 of the electrode holding device 3, and the work 4 is attached to the fixing device 5 (step S1). After the work 4 and the electrode 2 are centered (step S2), data on the work 4 and machining conditions are input by the input device 13 (step S3).

The electrolyte for example, sodium nitrate is supplied to the tank 15 (step S4) and the electrode 2 is set to provide the predetermined initial gap (step S5). Thereafter, the operation is started. After the electrolyte in the gap becomes stationary (a state where the flow and the movement of the electrolyte stops) (step S6), a predetermined machining pulse from the source device 8 is applied (step S7). It is determined whether the electrode voltage is abnormally increased (step S8). The determination is performed by the voltage change determining section 35 in dependency on the electrode voltage detected by the voltage detector 34. When the voltage abnormally increases, the supply of the machining pulse is stopped (step S9).

If there is no abnormality during the supply of the machining pulse after the pulse is cut off, the electrode 2 is raised (step S10) and clean electrolyte is injected through the nozzle 18 to the gap 17 (step S11), thereby removing the residual products from the gap 17. After the discharge of the electrolyte, the electrode 2 is lowered (step S12). It is determined whether a predetermined machining pulse was supplied, which is determined at the step S3 (step S13). When the answer is NO, the program returns to the step S5, thereby setting the electrode 2 to the initial position. (Since the initial position does not change, the gap is widened as the machining proceeds.) If the answer to the decision (step S13) is YES, the machining is finished.

In the present invention, the electrode voltage abnormally increasing phenomenon, which occurs immediately before the arc generates while the machining pulse is applied, is determined when the electrode voltage exceeds the peak value Vp, thereby cutting off the supply of the machining pulse. Hence as shown in FIG. 9, the pulse is cut off (pulse width t1) before a point B at which the arc is expected so that the short circuit of the electrode and the work during the supply of the machining pulse is prevented.

As a result, in particular when the work machined to a desired shape is finished with the electrode having a surface corresponding to the machining surface of the work by supplying a single pulse, the expensive work machined into three-dimensional shape is prevented from burning. Thus, the work can be accurately finished in a short time.

In the above-described embodiment, if the abnormal increasing of the electrode voltage occurs more than twice as shown in FIG. 4, the supply of the machining pulse is stopped at the first increase. The abnormal rise of the electrode voltage indicates that some kind of abnormality exists between the electrode and the work. Therefore, there is substantially no loss to manufacturing economy in prematurely stopping the machining pulse upon the first abnormality phenomenon. To the contrary, it has been confirmed by an experiment that the safety for the manufacturing is rather enhanced.

Although in the above-described embodiment, the reference value for determining the abnormality of the electrode voltage is the peak value Vp, the reference voltage may be determined as $Vp \pm d$ or $Vp \times \beta$ (where d and $\beta$ are predetermined values) in accordance with the constants of the resistors in each circuit.

Figure 10:
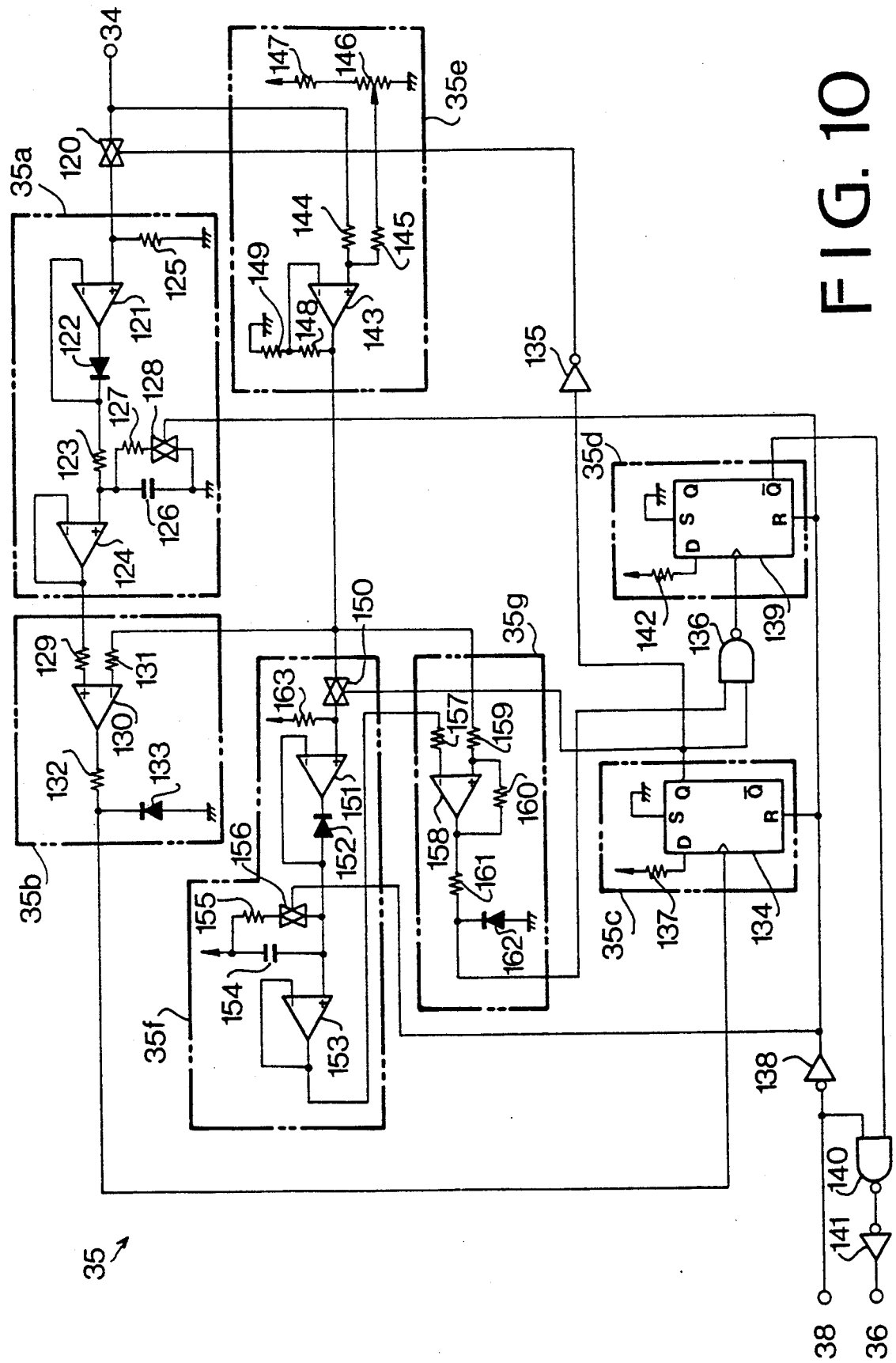
FIG. 10 shows a circuit of a voltage change determining section of a second embodiment of the present invention.
Figure 11:
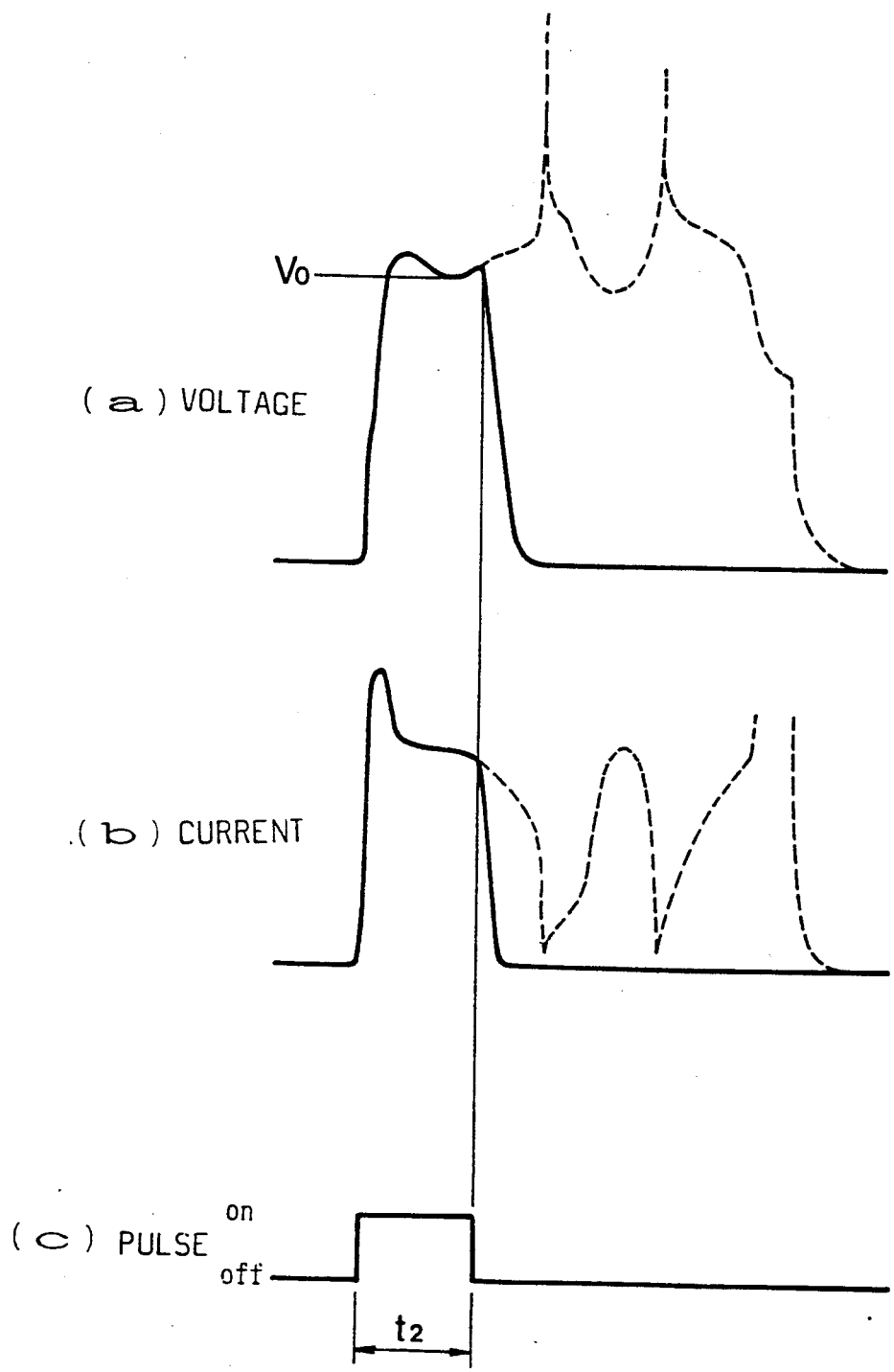
FIG. 11 is a timechart in the second embodiment.

FIG. 10 and 11 show the second embodiment of the present invention which is characterized in that a bottom value of the electrode voltage after peak voltage is detected, and that determining the abnormal increase of the electrode voltage is detected based on the detected bottom value. The same parts as in FIG. 10 is designated by the same numerals as in FIG. 7.

The voltage change determining section 35 shown in FIG. 10 has the peak hold circuit 35a, comparator circuit 35b, peak passage memory circuit 35c, cutoff holding circuit 35d, offset adder circuit 35e (the circuits listed have the same constructions as those shown in FIG. 7, so that the explanation thereof are omitted), and further has a bottom hold circuit 35f and a comparator circuit 35g.

The bottom hold circuit 35f comprises an amplifier 151 and an amplifier 153. One of the inputs of the amplifier 151 is connected to the output of the offset adder circuit 35e through an analog switch 150 and the other input is connected to the output thereof. One of the inputs of the amplifier 153 is connected to the output of the amplifier 151 through a diode 152 and to the source through a capacitor 154. The other input of the amplifier 153 is connected to the output thereof. Across the capacitor 154 are connected a resistor 155 and an analog switch 156 connected with each other. The analog switch 156 is connected to the gate 138.

The comparator circuit 35g has a comparator 158 one of the inputs of which is connected to the output of the amplifier 153 through a resistor 157. The other input of the comparator 158 is connected to the output of the offset adder circuit 35e through a resistor 159 and to the output of the comparator 158 through a resistor 160. The output of the comparator 158 is connected to one of the inputs of the NAND gate 136 through a resistor 161. The resistor 161 is connected to the ground through a diode 162. The analog switch 150 of the bottom hold circuit 35f is connected to one of the output terminals Q of the FF 134 of the peak passage memory circuit 35c. Numeral 163 designates a resistor for connecting the other input of the amplifier 151 to the source.

The voltage change determining section 35 is operated as follows. The peak value of the electrode voltage is detected by the peak hold circuit 35a and the comparator circuit 35b. When the passing of the peak is stored in the peak passage memory circuit 35c, that is, when the FF 134 is set, the high level signal (H) from the FF 134 is fed to the analog switch 150, thereby closing it. Thus, electrode voltage is fed to the bottom hold circuit 35f through the offset adder circuit 35e. (In this state, the analog switch 120 is opened so that the input to the peak hold circuit 35a is prohibited.)

When the bottom value Vo (see FIG. 11) is held in the bottom hold circuit 35f, the bottom value Vo is compared with the voltage from the offset adder circuit 35e, that is the electrode voltage, at the comparator circuit 35g. When the electrode voltage becomes larger than the bottom value Vo, the output of the comparator 158 is inverted, (L → H), thereby applying a high level signal to the NAND gate 136. The output of the NAND gate 136, in accordance with the high level signals (H) from the comparator 158 and the FF 134, is inverted (L → H), thus, setting the FF 139. The output Q (L) of the FF 139 is applied to the gate circuit 36 through the NAND gate 140 (L → H) and the gate 141 (H → L), so that the discharge switches 25-1 to 25-n are rendered in operative. The off state is held until the reset pulse is applied to the FF 139. Alternatively, the NAND gate 136 is constructed to be operated only in dependency on the output of the comparator circuit 35g.

Thus, in the present embodiment, the bottom value Vo is detected after the peak value is detected, and the electrode voltage is compared with the bottom value Vo. When the electrode voltage exceeds the bottom value Vo, the supply of the machining pulse is stopped. Therefore, the abnormal increase of the electrode voltage before the occurrence of the arc is detected at the start of the increase so that the supply of the machining pulse can be stopped at the earlier stage (pulse width t2 in FIG. 11), thereby preventing the burning of the work. In addition, even if there is a time delay in the circuit in the course of the detection of the abnormality to the cutting off of the machining pulse, the machining pulse can be cut off before the discharge voltage is abnormally increased so that the burn of the work can be reliably prevented. The present embodiment is effective in a case where the machining surface area is large. Needless to say, the reference value in the present embodiment can be set with a predetermined width with respect to the bottom value Vo.

Figure 12A:
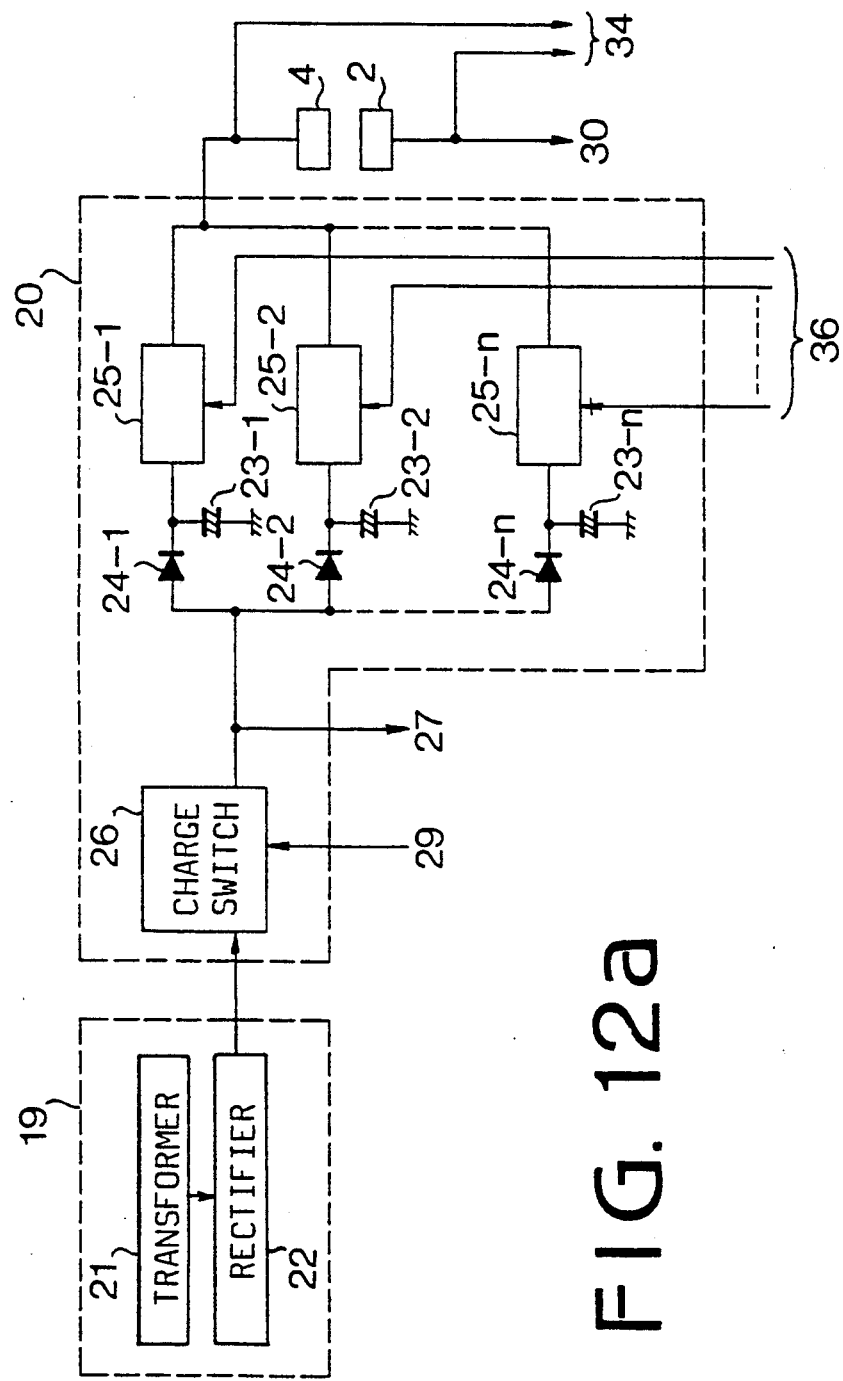
FIGS. 12a and 12b show a block diagram of a main part of an electrolytic finishing system as a third embodiment of the present invention.
Figure 12B:
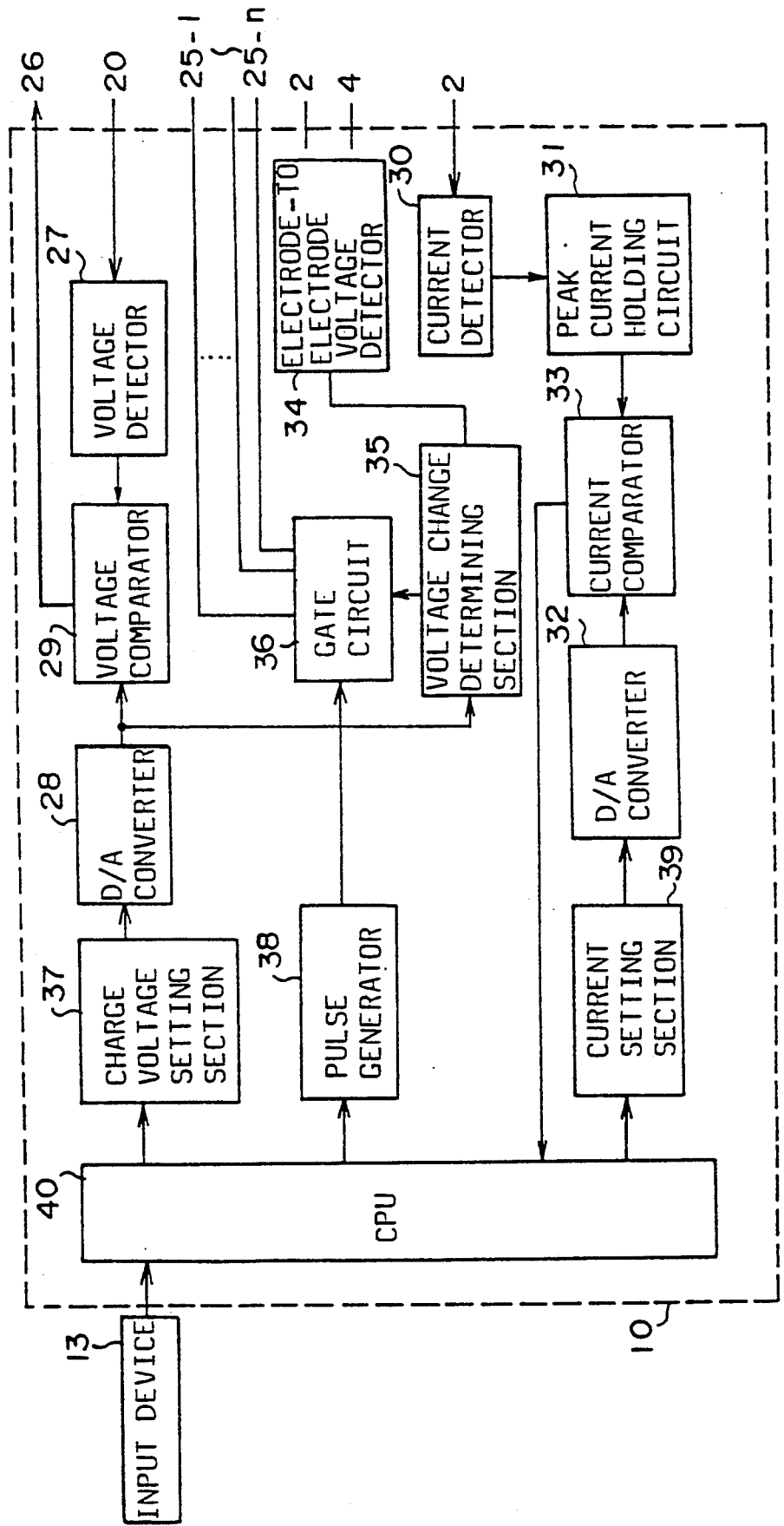
Figure 13:
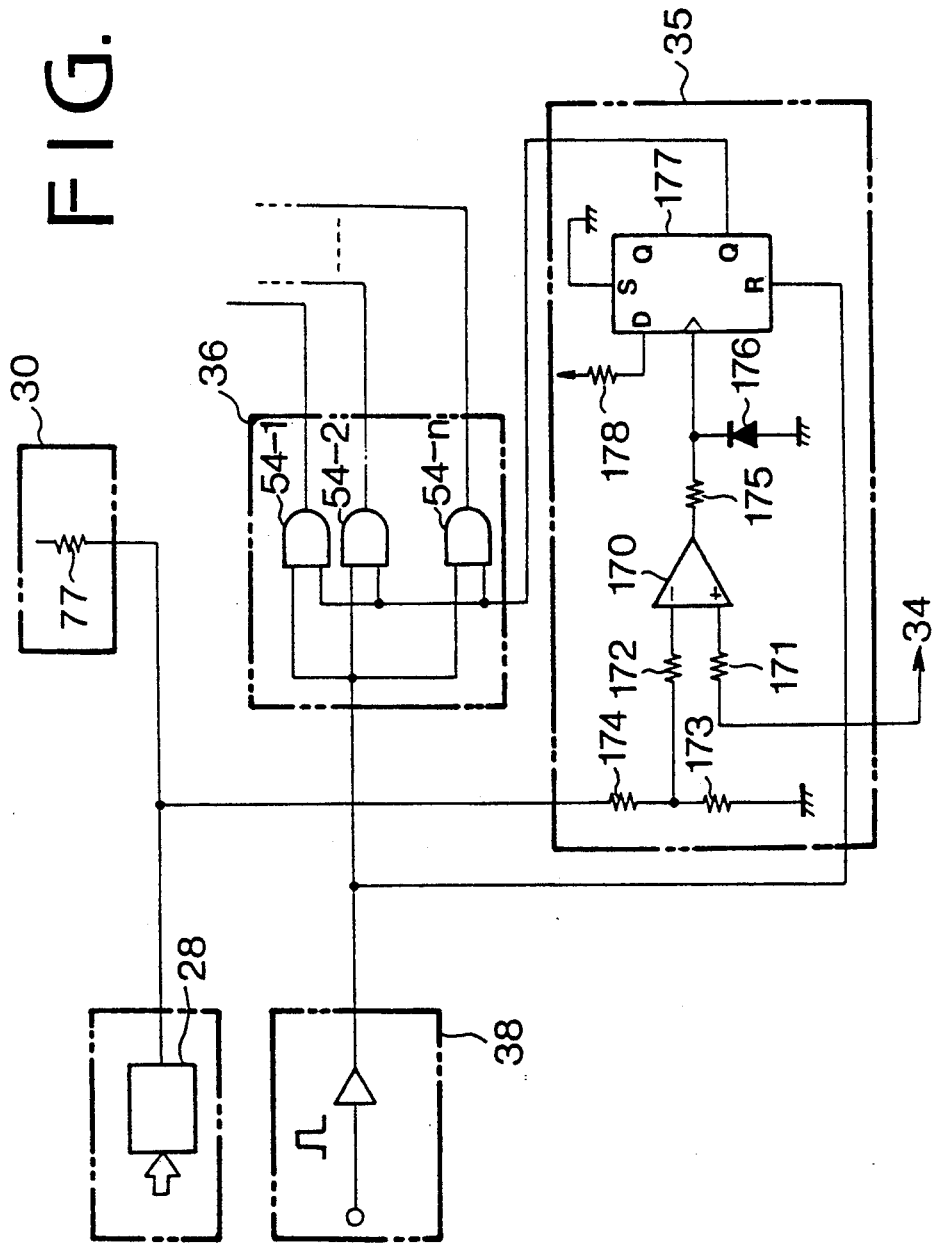
FIG. 13 shows a circuit of a voltage change determining second the third embodiment.
Figure 14:
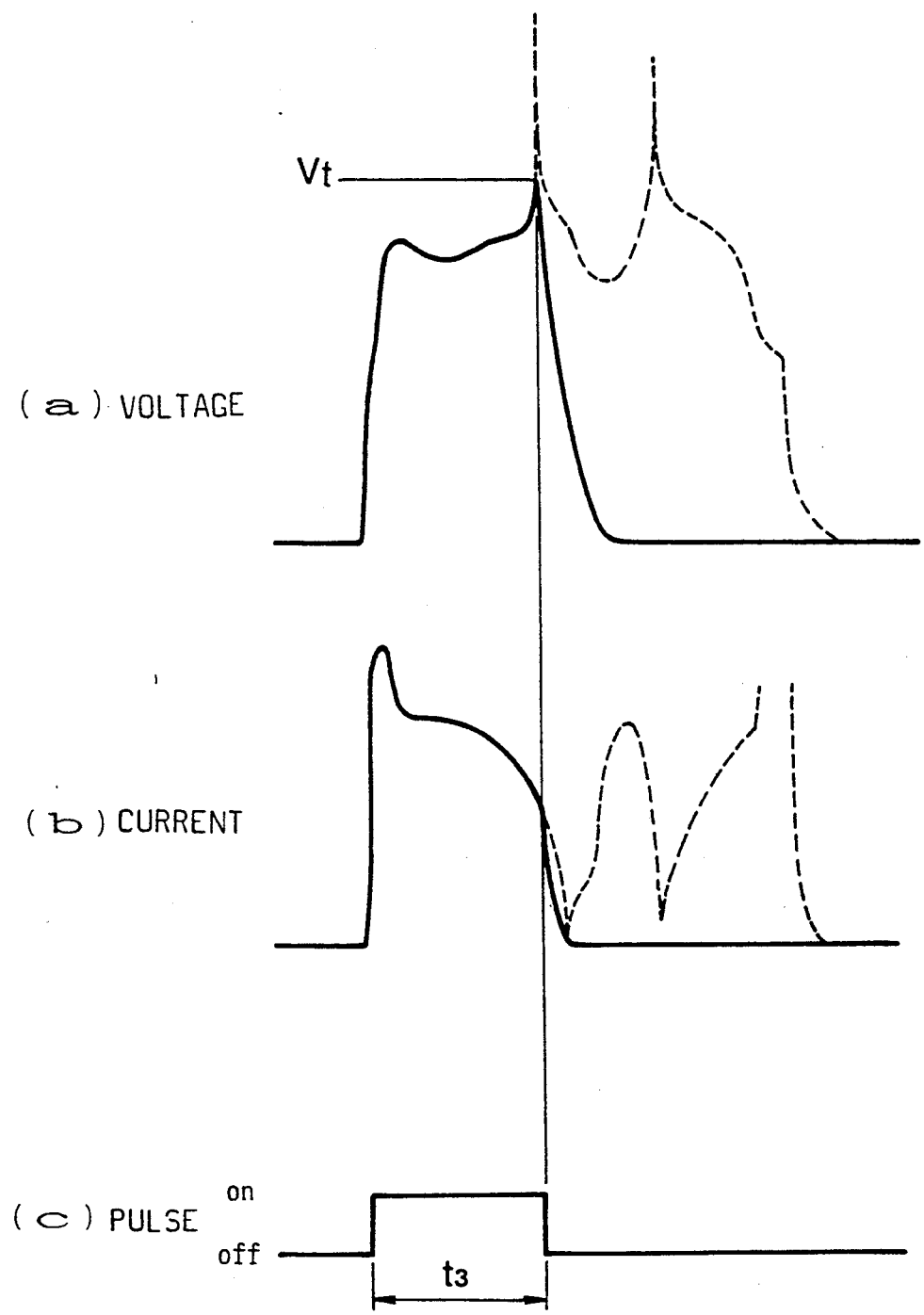
FIG. 14 is a timechart for explaining the operation of the third embodiment.

FIGS. 12 to 14 show the third embodiment of the present invention where the electrode voltage during the supply of the machining pulse is compared with the set charge voltage at the capacitors 23-1 to 23-n, and the abnormal increasing phenomenon of the discharge voltage is detected based on the comparison. The present embodiment is described hereinafter with reference to the figures where the same parts are designated by the same numerals as those in FIGS. 2 and 3.

Referring to FIGS. 12(a)–12(b), the voltage change determining section 35 compares the electrode voltage detected by the electrode-to-electrode voltage detector 34 with the output of the D/A converter 28 and applies the result to the gate circuit 36. Namely, a charging voltage set by the charge voltage setting section 37, which is to be charged in the capacitors 23-1 to 23-n, is converted to the analog voltage by the D/A converter 28. The analog voltage is compared with the electrode voltage detected by the electrode-to-electrode voltage detector 34 to detect an abnormal increasing of the electrode voltage.

As shown in FIG. 13, one of the inputs of a comparator 170 of the voltage change determining section 35 is connected to the output of the electrode-to-electrode voltage detector 34 through a resistor 171. The other input of the comparator 170 is connected to a resistor 173 grounded through a resistor 172 and to a resistor 174 connected to the D/A converter 28. The output of the comparator 170 is connected to a trigger terminal of an FF 177 through a resistor 175. The trigger terminal is grounded through a diode 176. The output terminal $\overline{Q}$ is connected to an input of each AND gate 54-1 to 54-n of the gate circuit 36. The D-terminal of the FF 177 is pulled up to the source through a resistor 178. The S-terminal is grounded and the R-terminal is connected to the pulse generator 38.

When the voltage detected by the electrode-to-electrode voltage detector 34 exceeds a reference voltage which is set at the charge voltage setting section 37 and converted to the analog signal through the D/A converter 28, the output of the comparator 170 of the voltage change determining section 35 is inverted (L → H). Hence the FF 177 is set, thereby applying a low level signal (L) to the gate circuit 36 from the output terminal $\overline{Q}$ thereof. Thus, the AND gates 54-1 to 54-n are rendered inoperative, thereby cutting off the machining pulse. The cutoff of the pulse is maintained until the reset pulse is applied to the R-terminal of the FF 177.

In the present embodiment, the electrode voltage and the reference voltage Vt for the capacitors 23-1 to 23-n is compared. Thus, since the discharge of the capacitors 23-1 to 23-n is cut off (see FIG. 14) by opening the discharge switches 25-1 to 25-n when the electrode voltage exceeds the set voltage Vt, the electrode and the work are not applied with a high voltage exceeding the set voltage Vt for the capacitors 23-1 to 23-n. Hence the abnormal increasing of the voltage, which occurs before the arc generates, is detected, thereby preventing the occurrence of the short circuit beforehand. Alternatively, the voltage change determining section 35 may be constructed to be applied with the output signal of the charge voltage setting section 37 for setting the voltage charged at the capacitors 23-1 to 23-n, thereby simplifying the construction.

The means for detecting the abnormal increasing of the electrode voltage of the present invention is not confined to the construction of the voltage change determining section in the above-described embodiments, and may be combined, or constructed to employ another appropriate determining section for detecting the increase of the voltage. In the embodiments described hereinbefore, only the abnormal rising phenomenon of the electrode voltage is detected in order to predict the short circuit. However, an abnormal decrease of current also occurs together with an abnormal increase of the voltage. The present invention may be further modified to predict the generation of the arc and to cutoff the supply of the machining pulse when the two phenomena occur. Furthermore, the flowchart shown in FIG. 8 is merely an example and the present invention may be applied to other electrolytic finishing method and electrolytic die sink machining method.

Figure 15A:
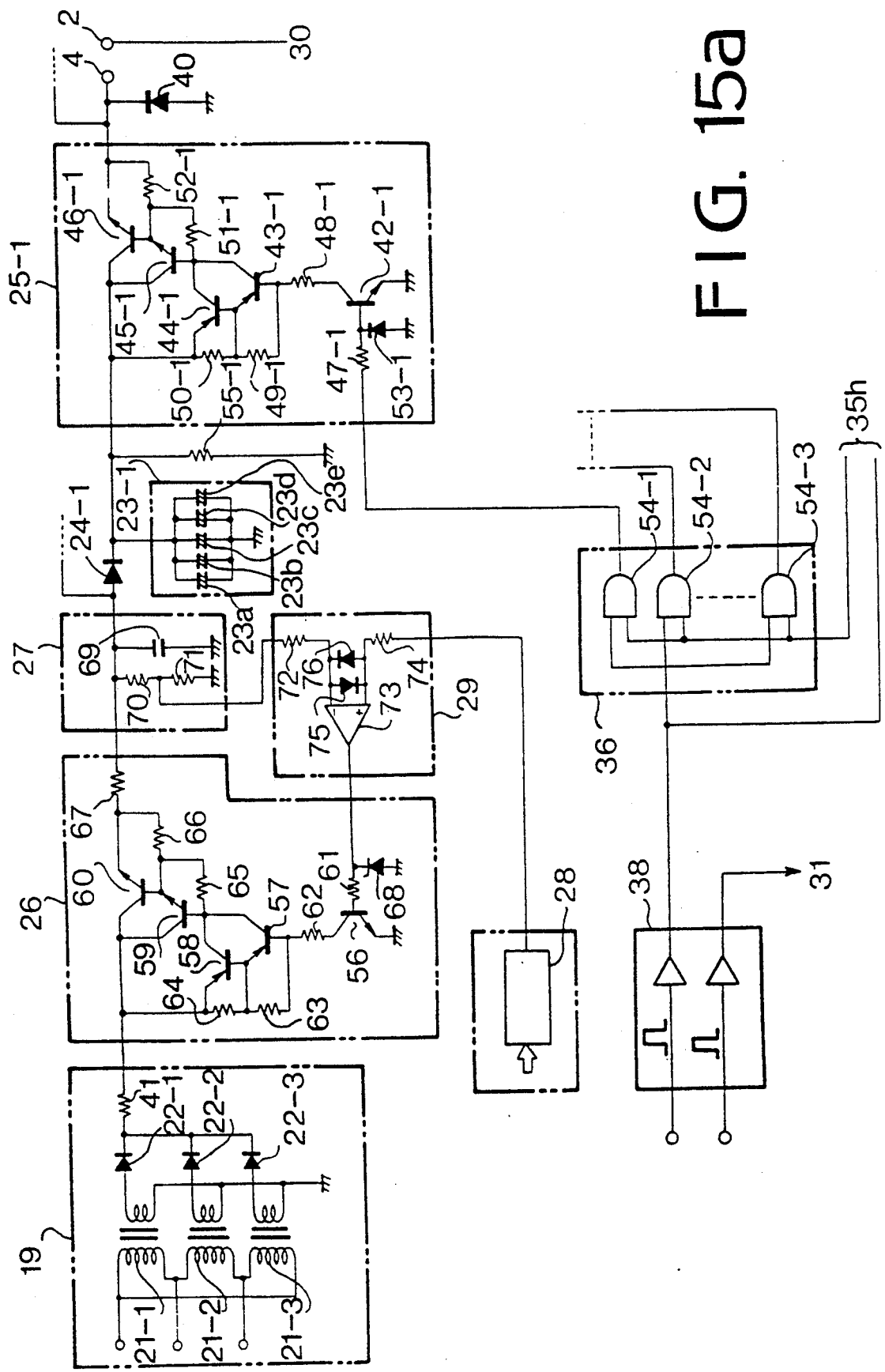
FIGS. 15a and 15b show a circuit in a fourth embodiment of the present invention.
Figure 15B:
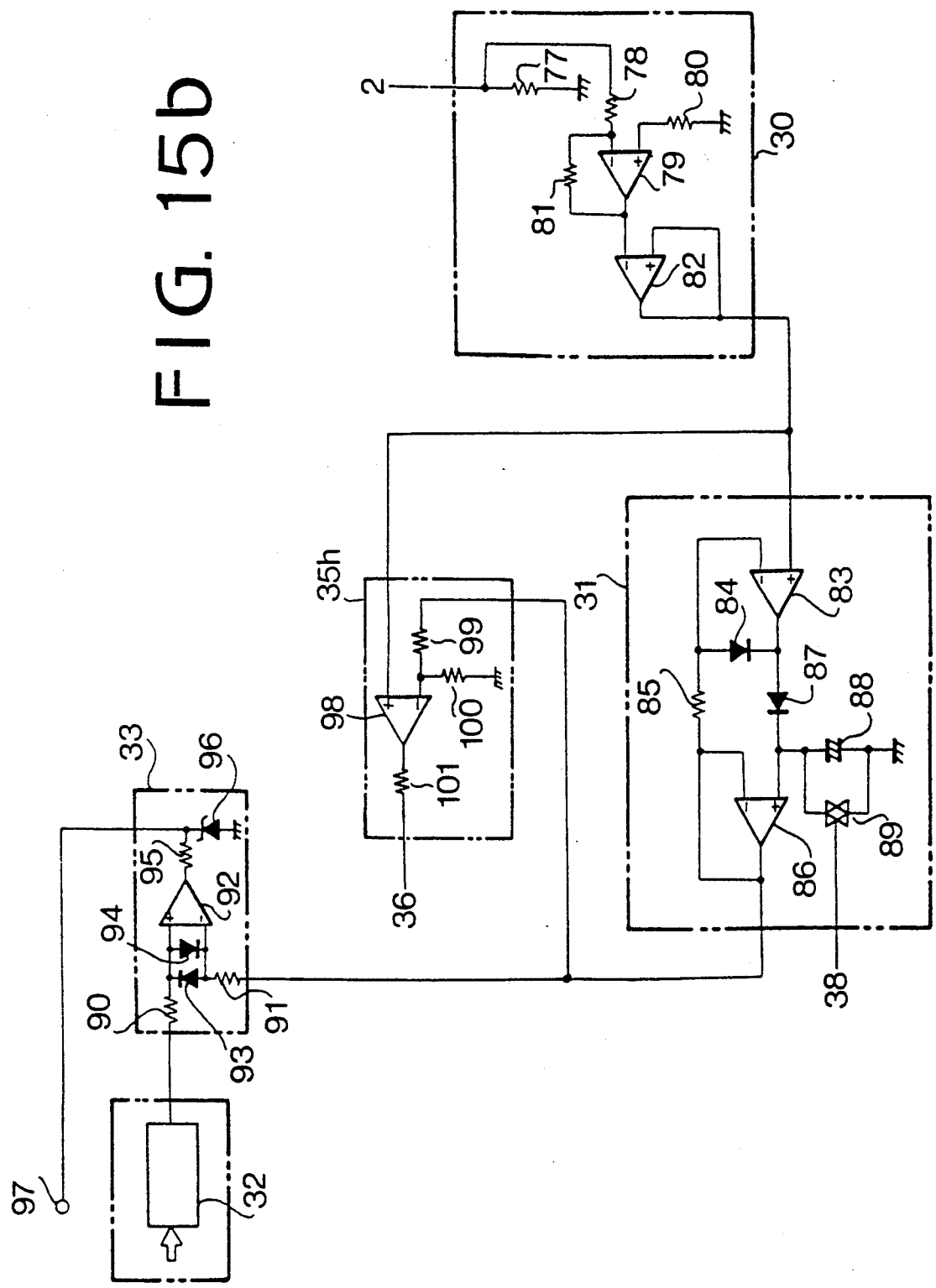

FIGS. 15(a)–15(b) show a main part of the electrolytic finishing machine to which the fourth embodiment of the present invention is applied. The present embodiment has a current change determining section 35h for detecting the abnormal decrease of the current. The current change determining section 35h has a comparator 98 one input of which is connected to an output of the amplifier 82 of the current detector 30. The other input of the comparator 98 is connected to the output of the amplifier 86 through a resistor 99 and to the ground through a resistor 100. The output of the comparator 98 is connected to one of the inputs of each AND gate 54-1 to 54-n of the gate circuit 36 through a resistor 101. The resistance of the resistor 100 is set at a value twice as large as the resistor 99.

When current i between the electrodes detected by the current detector 30 becomes two thirds of a peak value ip of the current heretofore detected, the output of the comparator 98 is inverted (H → H), thereby applying a low level signal (L) to the gate circuit 36. Thus, the discharge switches 25-1 to 25-n, are turned off. Each of the AND gates 54-1 to 54-n of the gate circuit 36 is connected to the current change determining section 35h and the pulse generator 38 to control each discharge switches 25-1 to 25-n in accordance with the input signal.

More particularly, in order to preferably discharge the capacitors 23-1 to 23-n in accordance with the high level signal (H) of the machining instruction pulse from the pulse generator 38 and the high level signal (H) of the current change determining section 35h, each of AND gates 54-1 to 54-n is operated so that each of transistors 42-1 to 42-n of the discharge switches 25-1 to 25-n is rendered operative in synchronism or selectively, thereby discharging the capacitors 23-1 to 23-n. At the same time, AND gates 54-1 to 54-n a rendered inoperative in accordance with at least one of low level signals (L) from the pulse generator 35 and the current change detector 35h to render transistors 42-1 to 42-n inoperative, thereby stopping the discharge of the capacitors 23-1 to 23-n. The other constructions are the same as those shown in FIG. 3.

Figure 16:
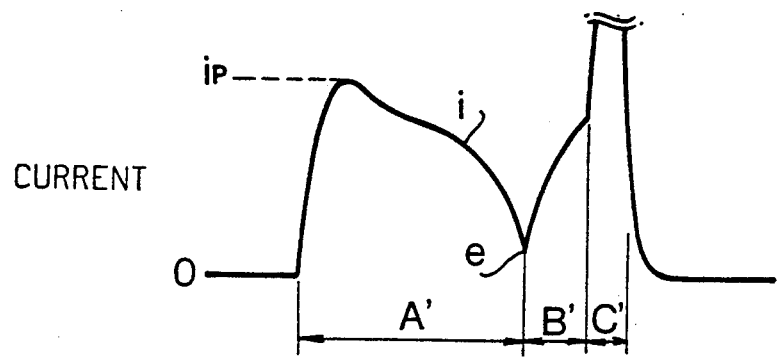
FIG. 16 shows a waveform of a discharge current when a short circuit occurs between electrodes.

As shown in FIG. 16, when the short circuit is expected, the current i abnormally decreases. The following is surmised from the waveform concerning the circumstance which leads to the short circuit.

During a period A' shown in the figure where the normal machining is carried out until the electrode-to-electrode current i decreases, the current i gradually decreases from the peak value ip because of the bubble and residual products generated. When a number of bubbles generate, the electrode and the work are temporarily insulated, so that the current i abnormally decreases (FIG. 16, point e). The abnormal decrease in current causes abnormal rise of the electrode voltage, resulting in a discharging phenomenon (arc). This occurs in a period B' in the figure. As the result of the arc, the electrode 2 and the work 4 are partly welded (short-circuited), thereby abnormally increasing the current i as shown in a period C'.

When a pulse having a large width is applied, the abnormal decreasing phenomenon of the current i may occur twice.

Thus, although there is a slight difference in the shape of the waveforms in dependency on the duration of the pulses, the phenomenon wherein the current abnormally decreases immediately before the arc is generated to cause short circuit, inevitably occurs. The fourth embodiment is to detect the abnormal decrease of current, thereby predicting the generation of the arc and to prevent beforehand the short-circuiting between the electrode and the work.

Figure 17:
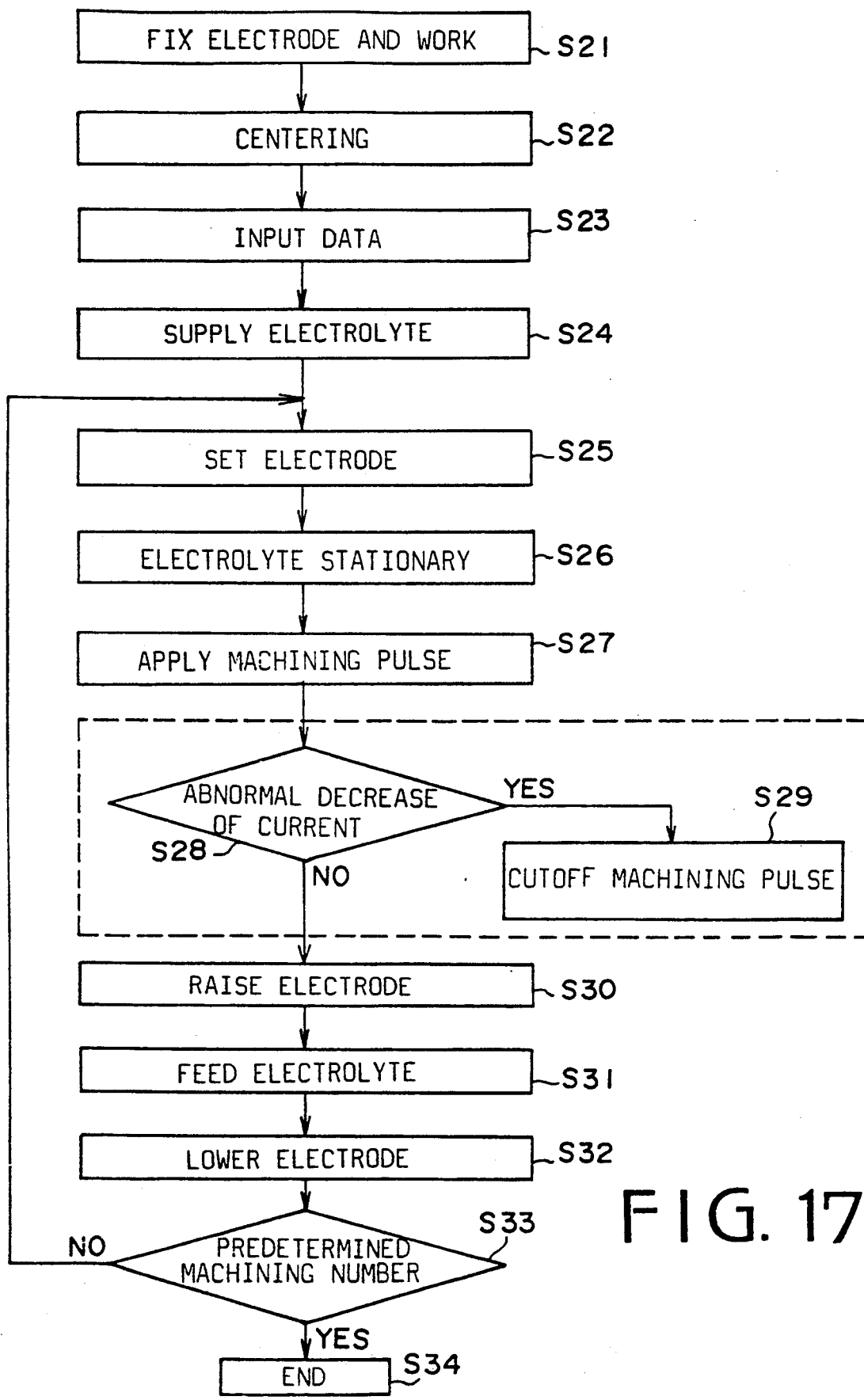
FIG. 17 is a flowchart showing the operation of an example of the fourth embodiment.

An example of the electrolytic finishing method to which the above-described short circuit predicting method is applied is described with reference to the flowchart shown in FIG. 17. The steps S21 to S27 are the same steps as shown in FIG. 8 and therefore the explanation thereof is omitted.

At a step S28, it is determined whether the current abnormally decreases during the supply of the machining pulse.

For determining, the current change determining section 35h compares the current i during the supply of the machining pulse with the peak value ip detected by the current detector 30 and held at the peak hold circuit 31. When the current i becomes smaller than two thirds of the peak value ip, the determining section 35h applies a signal to the gate circuit 36 to cut off the machining pulse (step S29). The reference value ip x ($\frac{2}{3}$) is predetermined in accordance with the resistances of the resistors 99 and 100 in the current change determining section 35h and may be modified as appropriate.

When the abnormal decreasing of the current does not occur while the machining pulse is being supplied so that the answer to the decision (step S28) is NO, the electrode 2 is raised (step S30) after the machining pulse is stopped. At the same time, clean electrolyte is fed to the gap 17 from the nozzle 18 (step S31) so as to remove residual products comprising electrolytic products. The successive steps are the same as in the operation shown in FIG. 8.

If the machining pulse is cut off at the step S29, the machining is continued after the cause of the abnormal decrease of the current is eliminated.

Figure 18:
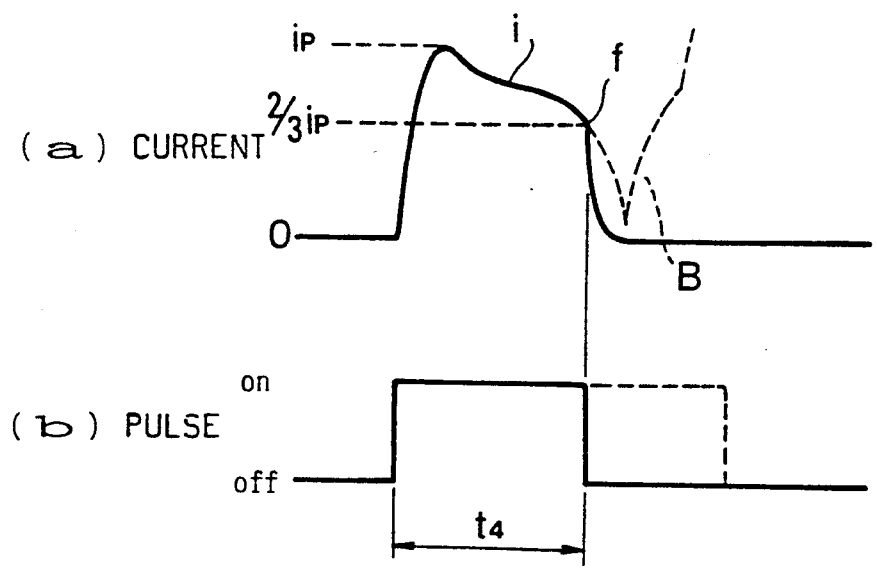
FIG. 18 is a timechart corresponding to FIG. 16 for explaining the operation thereof.

Thus, in accordance with the present embodiment, as shown in FIG. 18, when the current i during the supply of the machining pulse is smaller than the reference value based on the peak value, for example, two thirds of the peak value ip (point f in FIG. 18), the abnormal decrease of the current i is detected. As a result, the current change determining section 35h applies a signal to the gate circuit 36, thereby rendering the discharge switches 25-1 to 25-n, inoperative. Hence the machining pulse is cut off (pulse width t4) before the arc is generated, thereby preventing the arc and accordingly, the short circuit caused by the arc beforehand.

Figure 19A:
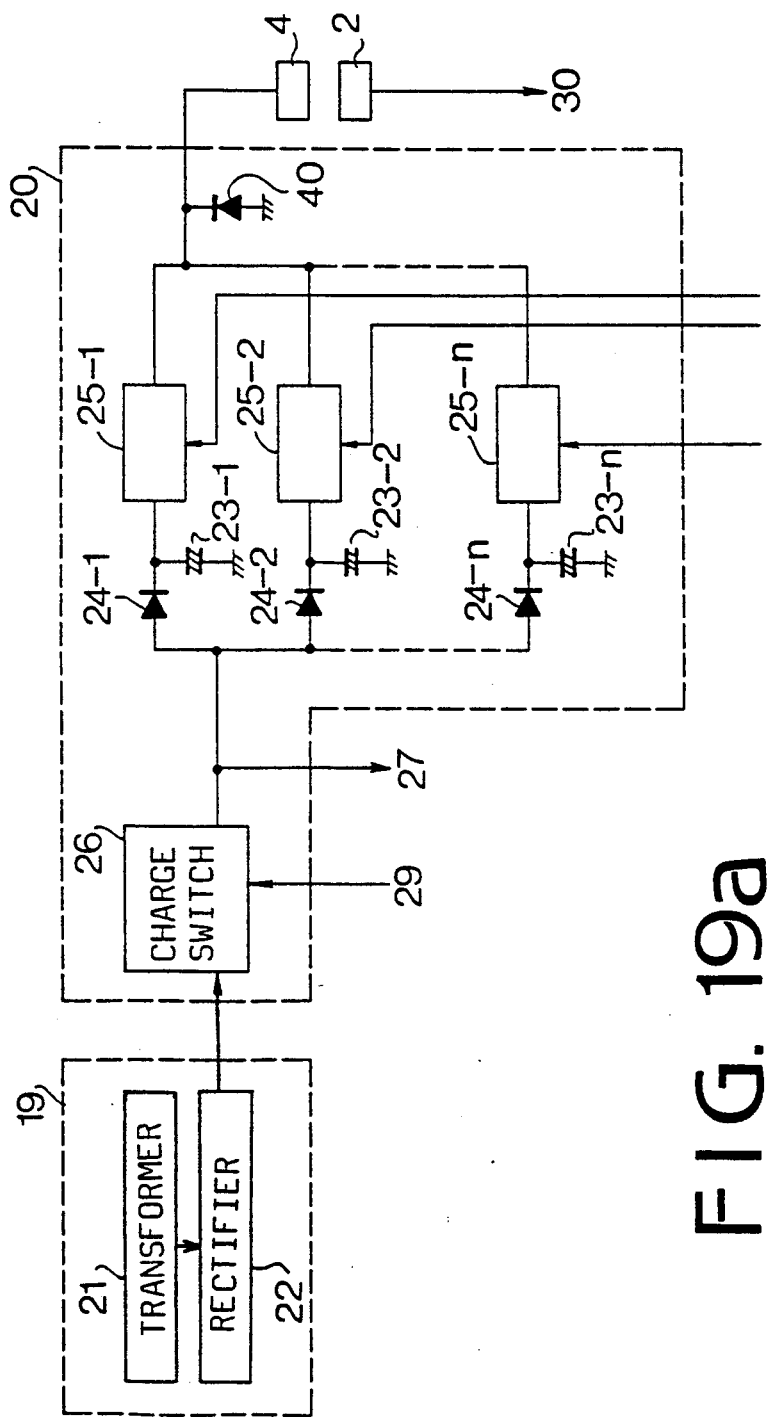
FIGS. 19a and 19b show a block diagram of a main part of an electrolytic finishing system as a fifth embodiment of the present invention.
Figure 19:
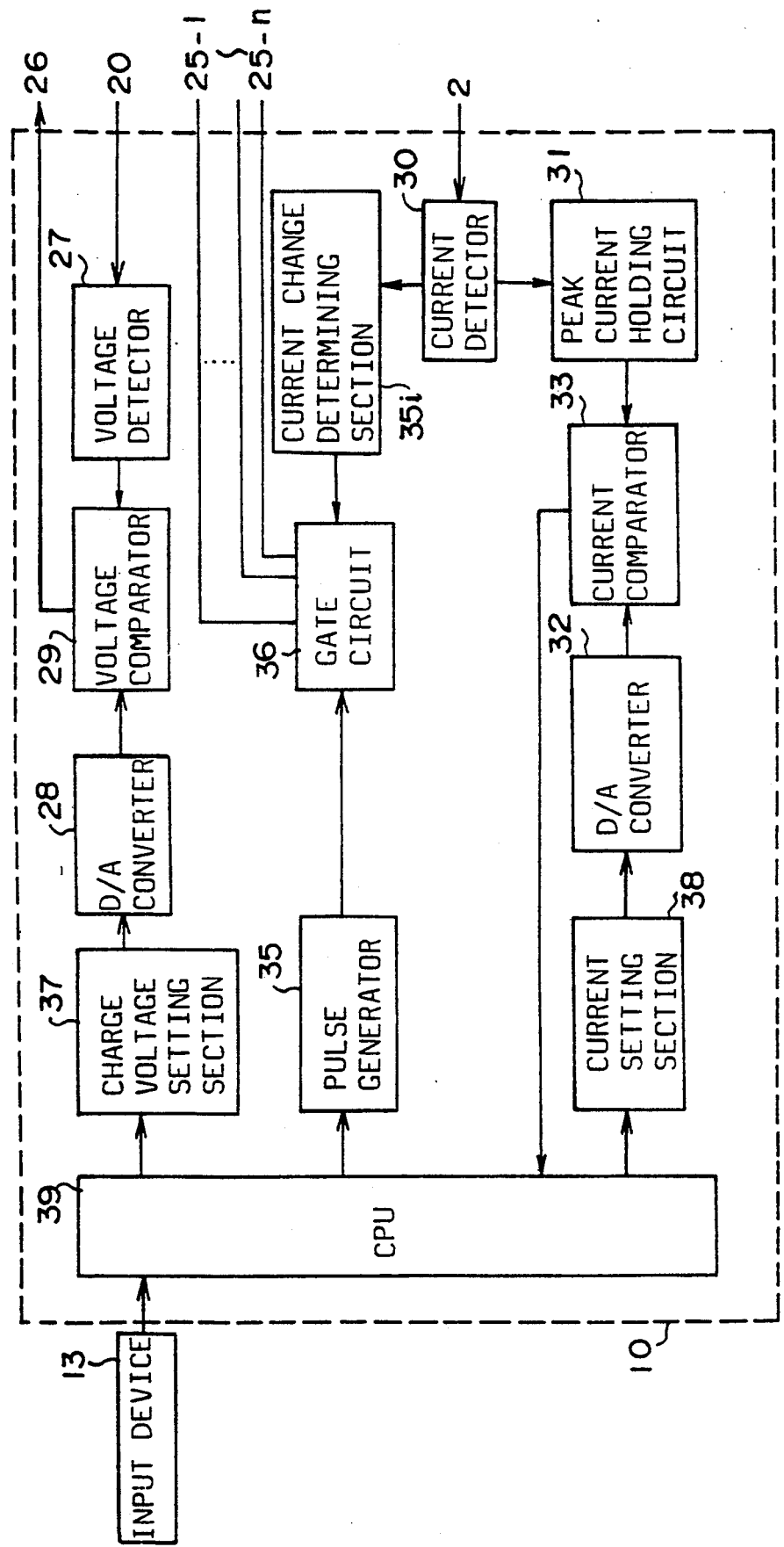
Figure 20:
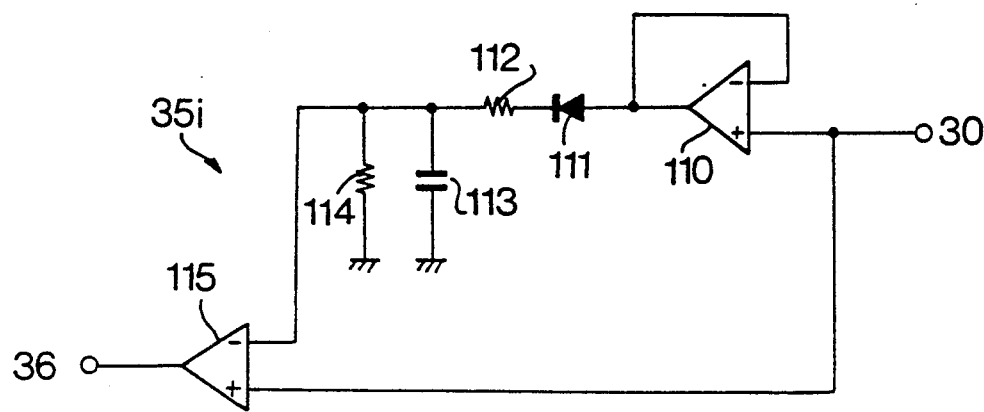
FIG. 20 shows a circuit of a current change determining section of a the fifth embodiment.
Figure 21:
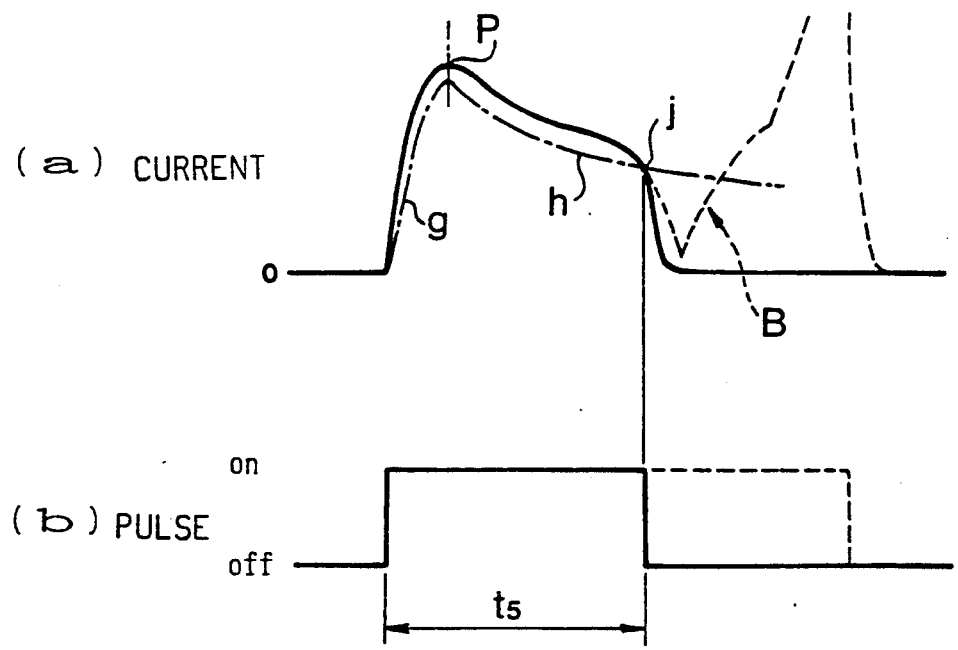
FIG. 21 is a timechart for explaining the operation of the fifth embodiment.

FIGS. 19 to 21 show the fifth embodiment.

The embodiment shown in FIGS. 19(a)-19(b) is different from that shown in FIGS. 15(a)-15(b) in that a current change determining section 35i detects the change in the electrode current only in dependency on the input signal from the current detector 30.

As shown in FIG. 20, the current change determining section 35i comprises an amplifier 110 one of the inputs of which is connected to the output of the current detector 30 and the other is connected to the output of the amplifier 110, and a comparator 115 one input of which is connected in series to the output of the amplifier 110 through a diode 111 and a resistor 112 and to the ground through a capacitor 113 and a resistor 114. The other input of the comparator is connected to the input of the amplifier 110.

The current change determining section 35i compares the current i detected by the current detector 30 with reference current ik of a current curve set by the capacitor 113 and the resistor 114, thereby detecting an abnormal decreasing of the current i. The operation is described hereinafter.

The resistor 112 and the capacitor 113 in the current change determining section 35i are set so as to render the current i input to the amplifier 110 to rise to a peak value P as shown by a waveform g in FIG. 21(a). The capacitor 113 and the resistor 114 are set so as to render an attenuation curve of the current (hereinafter called current curve) after the peak value P to form a waveform h in the figure. The resistance of resistor 114 is sufficiently larger than that of the resistor 112, or the resistor 112 may be omitted.

In the thus constructed current change determining section 35a, when the machining pulse is applied and the current i is detected at the current detector 30, the current i is fed to the inputs of the amplifier 110 and the comparator 115, respectively. The current i input to the amplifier 110 is amplified and the current shown by the waveform g is fed to the other input of the comparator 115. When the current i passes the peak value P, the capacitor 113 is discharged through the resistor 114 while the diode 111 prevents the reverse current. The discharge causes the current curve shown by the waveform h to be formed, the current ik of which is compared with the current i at the comparator 115.

When the current i is larger than the current ik, namely when it is above current curve, the output of the comparator 115 is maintained at an H level. However, when the discharge current decreases below the current ik, the output of the comparator 115 is inverted (H → L), so that a low level output (L) is applied to the gate circuit 36. Thus, the discharge switches 25-1 to 25-n are rendered inoperative, thereby cutting off the machining pulse (pulse width t5).

In the embodiment, the current change determining section 35i predetermines the current curve after the peak value and compares the current ik of the current curve with the current i to detect the abnormal decreasing phenomenon. Hence as in the previously described embodiment, the machining pulse is cut off before the arc generates, thereby preventing the short-circuiting caused by the arc.

Figure 22:
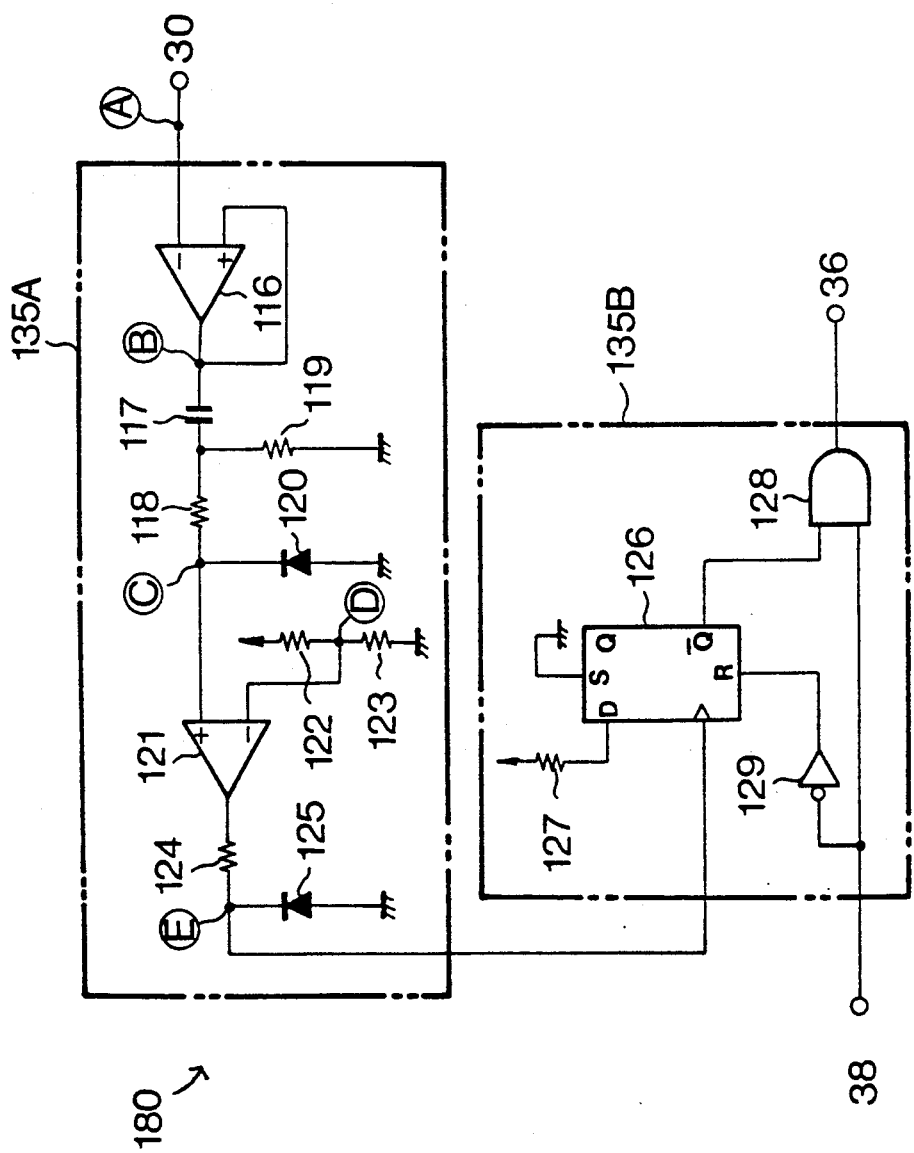
FIG. 22 shows a circuit of a current change determining section of a sixth embodiment of the present invention.
Figure 23:
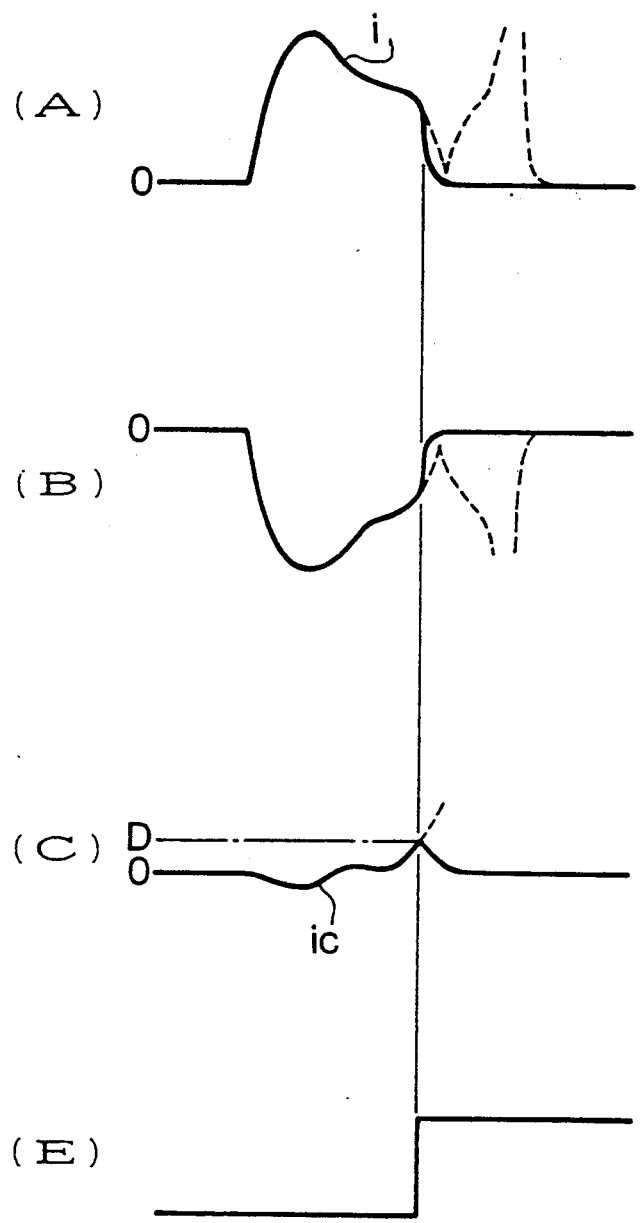
FIG. 23 is a timechart for explaining the operation of the sixth embodiment.
Figure 23:
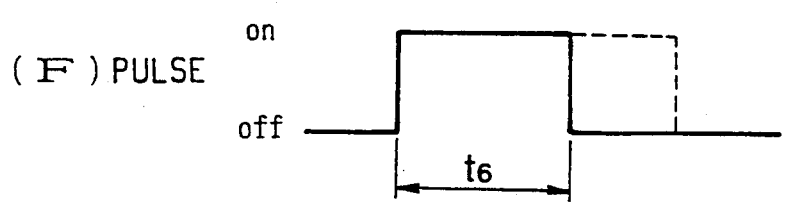

FIGS. 22 and 23 show the sixth embodiment wherein abnormal decreasing of the current is detected when a changing rate of the current detected after the peak value is larger than a predetermined reference value.

A current change determining section 180 has a comparator circuit 135A and a cutoff holding circuit 135B as shown in FIG. 22. The comparator circuit 135A comprises an amplifier 116 one input of which is connected to the output of the current detector 30 and the other input is connected to the output of the amplifier 116. The output of the amplifier 116 is connected to one of the inputs of a comparator 121 through a capacitor 117 and a resistor 118. The capacitor 117 and the input of the comparator 121 are connected to the ground through a resistor 119 and a diode 120, respectively. The resistance of the resistor 119 is sufficiently larger than that of the resistor 118. The other input of the comparator 121 is connected to the source through a resistor 122 and to the ground through a resistor 123 The output of the comparator 121 is connected to a resistor 124 which is grounded through a diode 125.

The cutoff holding circuit 135B has an FF 126, the trigger terminal of which is connected to the output of the comparator circuit 135A. The output $\bar{Q}$ is connected to one of the inputs of an AND gate 128. The D-terminal of the FF 126 is connected to the source through a resistor 127, the S-terminal to the ground, and the reset terminal R to a gate 129. The input of the gate 129 is connected to the pulse generator 38. The other input of the AND gate 128 is also connected to the pulse generator 38.

The operation of the current change determining section 180 is described hereinafter with reference to FIG. 23. FIGS. 23(A) to (E) respectively show current waveforms at points A to E. As shown in FIG. 23(A), when the current i is fed from the current detector 30, one of the inputs of the comparator 121 is applied with a current ic as shown in FIG. 23(C). The current ic and a reference current D set in accordance with the resistors 122 and 123 are compared with each other by the comparator 121. When the current ic exceeds the reference current D, the output of the comparator 121 is inverted (L → H, FIG. 23(E)).

The high level signal from the comparator renders the FF 126 operative, thereby applying a low level signal (L) to the AND gate 128 from the output terminal $\bar{Q}$. Thus, a low level signal (L) is fed to the gate circuit 36. Hence each of AND gates 54-1 to 54-n of the gate circuit 36 is turned off to render the discharge switches 25-1 to 25-n inoperative, thereby cutting off the machining pulse at a pulse width t6 (FIG. 23(F)). The cutoff of the pulse is maintained until a reset pulse is fed to a reset terminal R of the FF 126.

Thus, in the present embodiment, the abnormal decreasing phenomenon is detected when the current i becomes larger than the predetermined value D, which depends on the resistors 122 and 123, within a predetermined time, which depends on time constants of the capacitor 117 and the resistor 119. That is, when the changing rate of the discharge current is larger than the predetermined value, a rapid change in the electrode current is detected. Therefore, the start of the abnormal decreasing is detected so that the supply of the machining pulse is stopped at an earlier stage before the arc generates. As a result, even if there is a time delay in the circuits, the supply of the machining pulse is reliably cut off before the arc generates.

Figure 24:
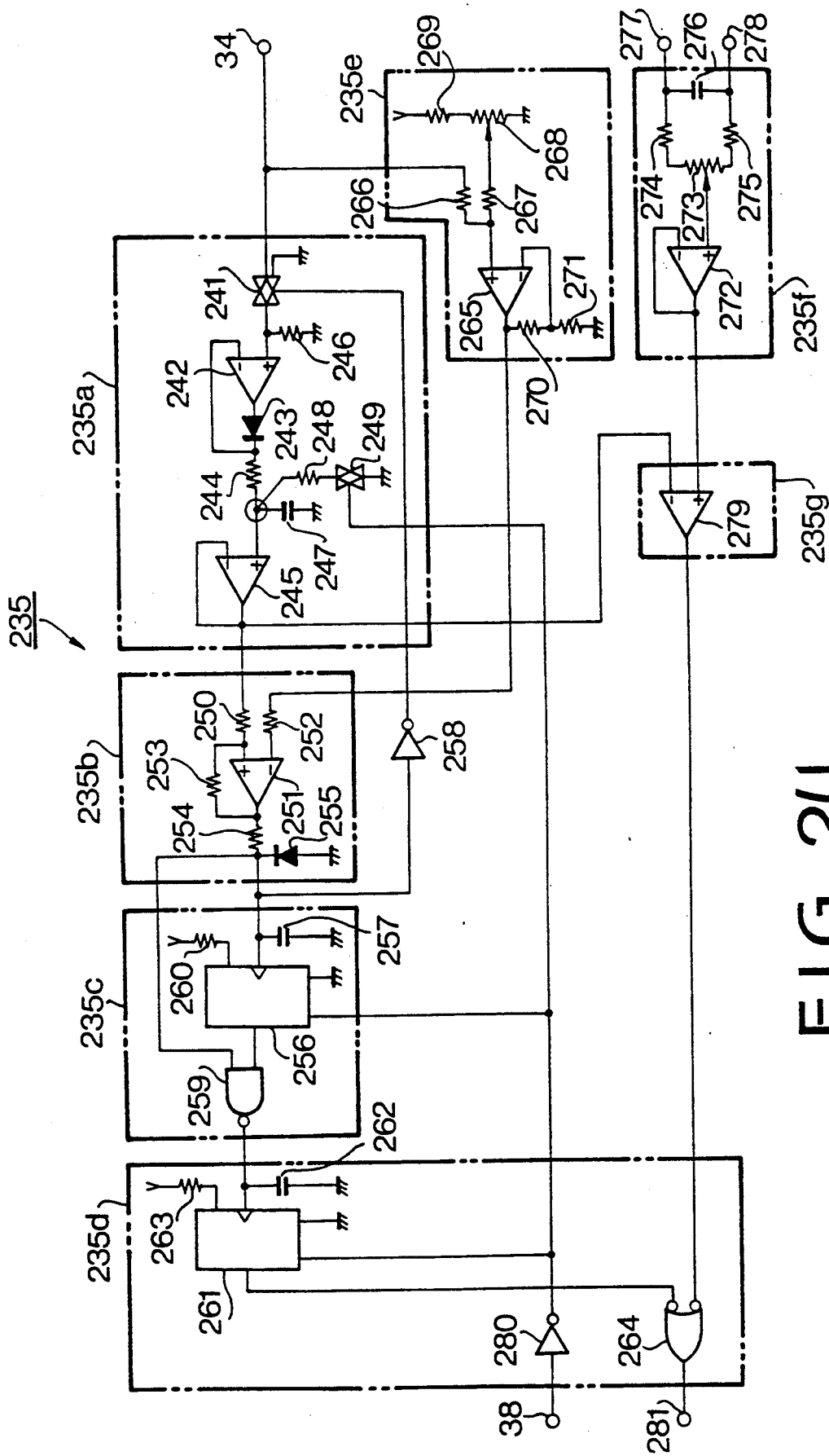
FIG. 24 shows a circuit of a voltage change determining section of a seventh embodiment of the present invention.

FIG. 24 shows a voltage change determining section 235 of the seventh embodiment of the present invention. The other constructions are the same as those shown in FIG. 3. The voltage change determining section 235 comprises a peak hold circuit 235a, first comparator circuit 235b, peak passage memory circuit 235c, cutoff circuit 235d, offset adder circuit 235e, reference voltage circuit 235f and a second comparator 235g.

The peak hold circuit 235a has an amplifier 242 one input of which is connected to the output of the electrode-to-electrode voltage detector 34 shown in FIG. 3 through an analog switch 241, and an amplifier 245 one of the input of which is connected to the output of the amplifier 242 through a diode 243 and a resistor 244. The input of the amplifier 242 is connected to the ground through a resistor 246, and the other input is connected to the output of the diode 243. The other input of the amplifier 245 is connected to the ground through a capacitor 247, across which are connected a resistor 248 and an analog switch 249 connected with each other in series. The other input of the amplifier 245 is connected to the output thereof. The analog switch is connected to a gate 280.

The first comparator circuit 235b has a comparator 251 one of the inputs of which is connected to the output of the amplifier 245 through a resistor 250. The other input of the comparator 251 is connected to the output of an adder 265, which will be later described, through a resistor 252. The other input of the comparator 251 is connected to the output thereof through a resistor 253 and the output is connected to a resistor 254 which is connected to the ground through a diode 255 in turn.

The peak passage memory circuit 235c has an FF 256, the trigger terminal of which is connected to the comparator 251 through the resistor 254. The trigger terminal of the FF 256 is connected to the ground through a capacitor 257 and also to the analog switch 241 through a gate 258. The output terminal of the FF 256 is connected to one of the inputs of a gate 259, the other input of which is connected to the other output Q of the FF 256. The D-terminal of the FF 256 is pulled up to the source, the S-terminal is grounded and the R-terminal is connected to the pulse generator 38 shown in FIG. 3.

The cutoff circuit 235d has an FF 261, the trigger terminal of which is connected to the output of the gate 259 as well as to the ground through a capacitor 262. The other output $\bar{Q}$ of the FF 261 is connected to one of the inputs of a gate 264 the output of which is connected to a terminal 281. The other input of the gate 264 is connected to the second comparator circuit 235g. Numeral 263 designates a resistor provided to pull up the FF 261 to the source.

The offset adder circuit 235e has an adder 265, an input of which is connected to the electrode-to-electrode voltage detector 34 through a resistor 266, and also to the source through resistors 267 to 269 (resistor 268 is a variable resistor one end of which is grounded). The other input of the adder 265 is connected to the output thereof through a resistor 270 and to the ground through a resistor 271.

The reference voltage circuit 235f has an amplifier 272 one of the inputs of which is connected to the output thereof. The other input of the amplifier 272 is connected to a variable resistor 273. The ends of the variable resistor 273 are connected to terminals 277 and 278 through resistors 274 and 275, respectively. A capacitor 276 is connected between the terminals 277 and 278.

The second comparator 235g has a comparator 279, one of the inputs of which is connected to the output of the amplifier 272 of the reference voltage circuit 235f. The other input of the comparator 279 is connected to the output of the amplifier 245 of the peak hold circuit 235a. The output of the comparator 279 is connected to the other input of the gate 264 of the cutoff circuit 235d.

The operation of the voltage change determining section 235 is described hereinafter.

When the machining instruction pulse is fed from the pulse generator 38, the analog switch 249 is turned on and the reset state of each FF 256 and 261 is released, thereby setting the FFs. The discharge switches 25-1 to 25-n are rendered operative, so that the machining pulse is supplied. Thus, the electrode voltage is detected by the electrode-to-electrode voltage detector 34. The electrode voltage is input to the first comparator circuit 235b through the offset adder circuit 235e as well as to the peak hold circuit 235a where the peak value thereof is held.

When the electrode voltage increases to the peak value Vp, and the electrode voltage which passed the offset adder circuit 235e exceeds the peak value which is held by the peak hold circuit 235a, the output of the comparator 251 is inverted (L → H). Hence the trigger terminal of the FF 256 is applied with a high level signal (H), thereby setting the FF 256 so as to store the passing of the peak value. At the same time, the inverted output (H) of the comparator 251 is converted to the low level signal (L) at the gate 258, thereby turning off the analog switch 241 to prohibit the input of the output signal of the electrode-to-electrode voltage detector 34 to the peak hold circuit 235a.

If the condition between the electrode and the work is normal so that the short circuit does not occur, the voltage under the peak value Vp is detected for a period t which coincides with the pulse width. The electrode voltage becomes zero after the machining pulse is turned off. However, if there is an abnormality between the electrode and the work so that the electrode voltage exceeds the peak value Vp, the output signal of the comparator 251 is inverted (H → L). Thus, the FF 256 is reset, and the output of the gate 259 is inverted (L → H), setting the FF 261. The low level signal (L) from the output Q̄ of the FF 261 is accordingly applied to the gate 264, thereby inverting the output thereof (L → H).

The high level signal (H) from the gate 264 is fed to the gate circuit 36 through the terminal 281, thereby rendering each gate 54-1 to 54-n and hence the discharge switch 25-1 to 25-n, inoperative to cut off the supply of the machining pulse at a pulse width t7. The off state is maintained until a pulse from the pulse generator 38 is fed to the reset terminal of the FF 261.

The operation for detecting the abnormal increasing of the discharge voltage after the peak value Vp has been described.

Figure 25:
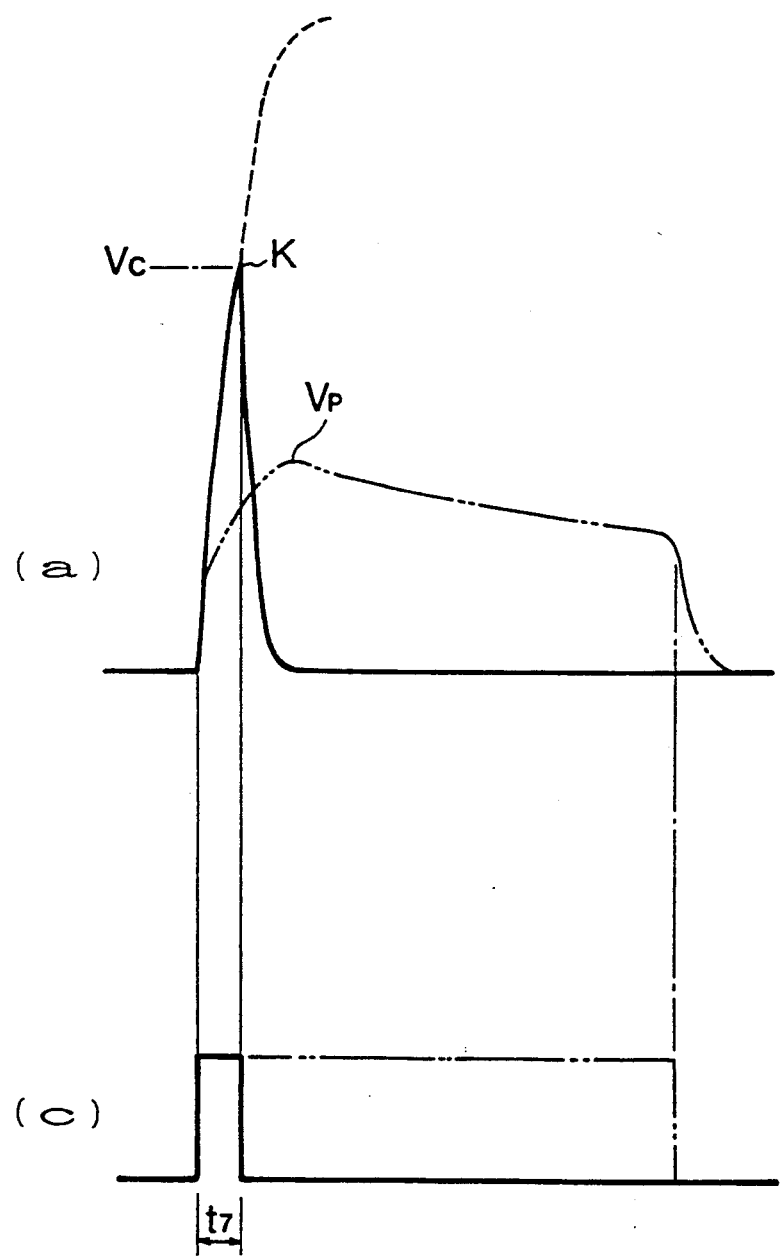
FIG. 25 is a timechart for explaining the operation of the seventh embodiment.

The operation of the voltage change determining section 235 is described hereinafter when the voltage abnormally increases due to one reason or another, before it reaches the peak value Vp as shown in FIG. 25.

The terminals 277 and 278 of the reference voltage circuit 235f are connected to the capacitors 23-1 to 23-n so that charge voltage Vc at the capacitors 23-1 to 23-n is detected by the reference voltage circuit 235f. The voltage Vc is compared with the voltage Vp (which gradually increases) detected at the peak hold circuit 235a at the second comparator 235g. When Vp ≧ Vc (at a point k in FIG. 25), the output of the comparator 279 is inverted (L → H), thereby turning on the gate 264 of the cutoff circuit 235d to cut off the machining pulse at the pulse width t7 as described above.

Thus, in the present embodiment, if the electrode voltage abnormally rises after the peak value Vp is detected, the phenomenon is detected by the first detecting circuit comprising the peak hold circuit 235a, first comparator 235b and peak passage memory circuit 235c, thereby stopping the machining pulse at the cutoff circuit 235d. When the electrode voltage abnormally increases before it reaches the peak value Vp, the phenomenon is detected by the second detecting circuit comprising the reference voltage circuit 235f and the second comparator 235g to cut off the supply of the machining pulse.

Therefore, the abnormal increasing phenomenon of the voltage after reaching the peak value Vp and the abnormal increasing phenomenon before reaching the peak value Vp are detected, thereby enabling to predict the occurrence of the arc during the supply of the machining pulse. Hence the burning of the work which is machined into a desired shape is prevented. In addition, the first and the second detecting circuits are connected in parallel, the electrode voltage is prevented from becoming a value higher than the voltage charged in the capacitors 23-1 to 23-n by the operation of the second detecting circuit even if the first detecting circuit should break down, thereby preventing the supply of the abnormal voltage between the electrodes.

Although the charge voltage at the capacitors 23-1 to 23-n are detected by the reference voltage circuit 235f in the present embodiment, the present invention is not confined to it and may be modified to set a predetermined reference voltage.

PROBABILITY OF INDUSTRIAL EXPLOITATION

The present invention is constructed as described above to provide the following effects.

The occurrence of an arc, which foretells a short circuit, is predicted so as to prevent beforehand the short circuit caused by the arc, thereby preventing the work from burning due to the short circuit.

Thus, when the invention is applied to an electrolytic finishing method, expensive work to be machined into a desired three-dimensional shape is protected from burning, while accurately finishing the work in a short time.

Detected electrode-to-electrode voltage (current) is compared with a peak value thereof to detect an abnormal increasing (decreasing) of the electrode voltage (current)so that, for example, a supply of the machining pulse is stopped immediately before the electrode voltage exceeds the peak voltage. As a result, the occurrence of the arc can be predicted at an early stage so as to prevent the short circuit beforehand.

We claim:

1. A method of predicting a short circuit in an electrolytic finishing system where a machining pulse is supplied between an electrode and a work disposed in electrolyte with a predetermined space there-between, so as to electrolytically finish the work, the method comprising the steps of:

detecting an abnormal increase of electrode-to-electrode voltage during supply of said machining pulse, said abnormal increase occurring independently of an increase of voltage at a short circuit between the electrode and the work at a time before the short circuit; and cutting off the supply of said machining pulse in according with the detection of the abnormal increase.

2. The method according to claim 1 further comprising the steps of:

detecting the electrode-to-electrode voltage while said machining pulse is supplied;

detecting a peak value of the voltage immediately after a start of the supply of the machining pulse;

comparing the electrode-to-electrode voltage after the peak value with the peak value; and cutting off the supply of said machining pulse when a voltage higher than the peak value is detected.

3. The method according to claim 1 further comprising the steps of:

detecting the electrode-to-electrode voltage while said machining pulse is supplied;

detecting a bottom value of the electrode-to-electrode voltage after a peak value is detected; and cutting off the supply of said machining pulse when the bottom value is detected.

4. A method of predicting an occurrence of short circuit in an electrolytic finishing system where a machining pulse caused by discharging a capacitor is supplied between an electrode and a work disposed in electrolyte with a predetermined space, so as to electrolytically finish the work, the method comprising:

setting a reference value;

detecting an abnormal electrode-to-electrode electric energy change during said machining pulse duration, said abnormal electrode-to-electrode electric energy change occurring independently of a change of electric energy at a short circuit between the electrode and the work at a time before the short circuit;

comparing the abnormal electrode-to-electrode electric energy change with said set reference value; and cutting off the supply of the machining pulse in accordance with a result of the comparison.

5. A method of predicting a short circuit in an electrolytic finishing system where machining pulse is supplied between an electrode and a work disposed in electrolyte with a predetermined space, there-between, so as to electrolytically finish the work, the method comprising the steps of:

detecting an abnormal decrease of electrode-to-electrode voltage during supply of said machining pulse, said abnormal decrease occurring before a short circuit between the electrode and the work; and cutting off the supply of said machining pulse in accordance with the detection of the abnormal decrease.

6. The method according to claim 5 further comprising the steps of:

detecting the electrode-to-electrode current while said machining pulse is supplied;

detecting a peak value of the electrode-to-electrode current which is produced immediately after the machining pulse is supplied;

comparing a reference value based on the peak value with the electrode-to-electrode current detected after the peak value is detected; and cutting off the supply of the machining pulse when the detected current becomes smaller than the reference value.

7. The method according to claim 5 further comprising the steps of:

detecting the electrode-to-electrode current while said machining pulse is supplied;

comparing the detected current with a current of a predetermined reference current curve; and cutting off the supply of the pulse when the detected current becomes smaller than the current of the reference current curve.

8. The method according to claim 5 further comprising the steps of:

detecting the electrode-to-electrode current while said machining pulse is supplied;

detecting a peak value of the electrode-to-electrode current which is produced immediately after the machining pulse is supplied;

detecting a changing rate of the electrode-to-electrode current after the peak value is detected and comparing the changing rate with a reference value; and cutting off the supply of the machining pulse when the detected changing rate is larger than the reference value.

* * * * *